United States Patent
Nakamura et al.

(10) Patent No.: US 11,334,449 B2
(45) Date of Patent: May 17, 2022

(54) INFORMATION PROCESSING APPARATUS, UPDATE CONTROL METHOD, AND INFORMATION PROCESSING SYSTEM

(71) Applicants: Daiki Nakamura, Kanagawa (JP); Yuichi Kawasaki, Kanagawa (JP); Tomoki Kanda, Kanagawa (JP); Ryutarou Ono, Kanagawa (JP)

(72) Inventors: Daiki Nakamura, Kanagawa (JP); Yuichi Kawasaki, Kanagawa (JP); Tomoki Kanda, Kanagawa (JP); Ryutarou Ono, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/019,362

(22) Filed: Sep. 14, 2020

(65) Prior Publication Data
US 2021/0133055 A1 May 6, 2021

(30) Foreign Application Priority Data

Oct. 31, 2019 (JP) .............................. JP2019-199178

(51) Int. Cl.
*G06F 11/14* (2006.01)
*G06F 11/07* (2006.01)
*G06F 8/65* (2018.01)
*G06F 11/30* (2006.01)

(52) U.S. Cl.
CPC ............ *G06F 11/1471* (2013.01); *G06F 8/65* (2013.01); *G06F 11/0772* (2013.01); *G06F 11/0787* (2013.01); *G06F 11/302* (2013.01)

(58) Field of Classification Search
CPC ............... G06F 11/302; G06F 11/0787; G06F 11/0772; G06F 11/1471
See application file for complete search history.

(56) References Cited

U.S. PATENT DOCUMENTS 7,356,727 B1 * 4/2008 McGhee ............. G06F 11/1433
714/2
2020/0177742 A1 6/2020 Homma

FOREIGN PATENT DOCUMENTS

| EP | 3260981 A1 * | 12/2017 | .......... G06F 11/1433 |
| JP | 2013-140595 | 7/2013 | |
| WO | WO-2005024628 A2 * | 3/2005 | .......... G06F 11/1433 |

OTHER PUBLICATIONS

U.S. Appl. No. 16/802,586, filed Feb. 27, 2020 Yuuichi Kawasaki, et al.

(Continued)

*Primary Examiner* — Nadeem Iqbal
(74) *Attorney, Agent, or Firm* — Xsensus LLP

(57) ABSTRACT

An information processing apparatus executes a plurality of programs. The information processing apparatus includes circuitry configured to: control execution of a plurality of update processes of updating the plurality of programs; when an update of a particular program performed by one or more update processes of the plurality of update processes has failed, acquire recovery information for recovering a function of the particular program whose update has failed; and execute a recovery process of recovering the function implemented by the particular program whose update has failed, based on the recovery information.

10 Claims, 18 Drawing Sheets

(56) References Cited

OTHER PUBLICATIONS

U.S. Appl. No. 16/808,411, filed Mar. 4, 2020 Takeshi Horiuchi, et al.
U.S. Appl. No. 16/816,260, filed Mar. 12, 2020 Hiroshi Hinohara, et al.

* cited by examiner

FIG. 7

| TYPE | ID | DEPENDENCY |
|---|---|---|
| OS UPDATE PATCH INSTALLER | B52C49AB-EED1 | - |
| APPLICATION INSTALLER | 745FD5B4-8606 | 973F1714-3944 |
| DRIVER INSTALLER | 973F1714-3944 | 745FD5B4-8606 |

| ERROR CODE | HANDLING PROCESS |
|---|---|
| 1001 | – EXECUTE DriverInstaller11.23.4Restore.exe |
| 1002 | – RESTART AFTER ACQUIRING DriverComponent.dll<br>– RE-EXECUTE DriverInstaller12.34.5.exe |
| 1003 | – EXECUTE Remove.bat<br>– EXECUTE DriverInstaller11.23.4Restore.exe |
| ⋮ | ⋮ |

INFORMATION PROCESSING APPARATUS, UPDATE CONTROL METHOD, AND INFORMATION PROCESSING SYSTEM

CROSS-REFERENCE TO RELATED APPLICATION

This patent application is based on and claims priority pursuant to 35 U.S.C. § 119(a) to Japanese Patent Application No. 2019-199178, filed on Oct. 31, 2019, in the Japan Patent Office, the entire disclosure of which is hereby incorporated by reference herein.

BACKGROUND

Technical Field

The present disclosure relates to an information processing apparatus, an update control method, and an information processing system.

Description of the Related Art

A technique is known that collectively updates a plurality of programs, such as an operating system (OS), application programs, and drivers, each being executed by an information processing apparatus.

For example, a system is known that downloads an update package for a plurality of programs and executes an installer application, to sequentially execute a plurality of installers, thereby updating the plurality of programs.

SUMMARY

According to an embodiment, an information processing apparatus executes a plurality of programs. The information processing apparatus includes circuitry configured to: control execution of a plurality of update processes of updating the plurality of programs; when an update of a particular program performed by one or more update processes of the plurality of update processes has failed, acquire recovery information for recovering, a function of the particular program whose update has failed; and execute a recovery process of recovering the function implemented by the particular program whose update has failed, based on the recovery information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7 is a diagram for describing dependency between a plurality of installers, according to the first embodiment of the present disclosure;

Figure 1:
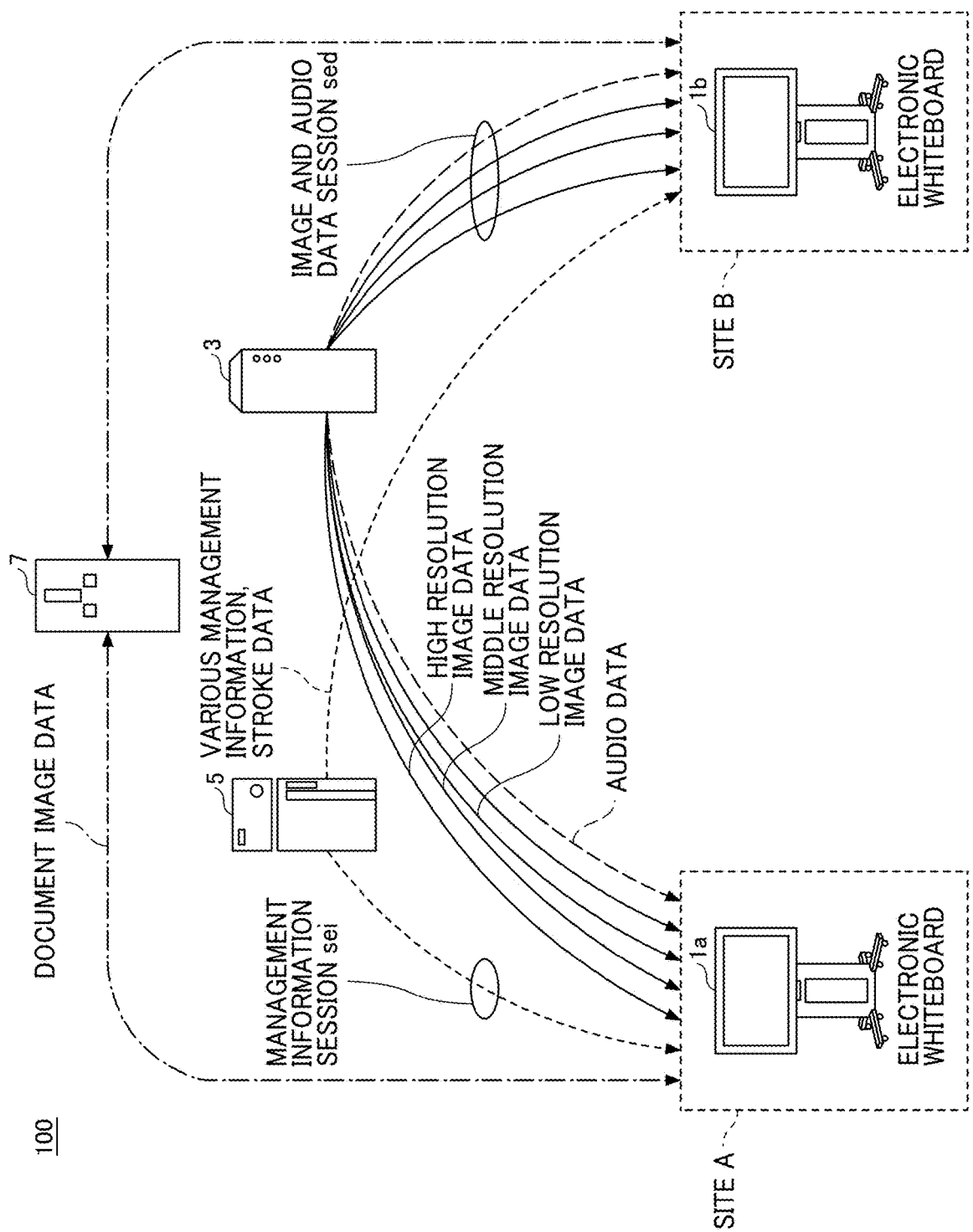
FIG. 1 is a schematic diagram illustrating an example of communication routes in a communication system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A description is given of several embodiments of the present disclosure with reference to drawings.

Overview of Communication System:

Before describing an information processing system according to the present embodiment, a description is given of an overview of a communication system, which is an example of a usage scene according to the present embodiment.

Communication Route:

A communication system 100 for conducting a videoconference between a plurality of electronic whiteboards including an electronic whiteboard 1a and an electronic whiteboard 1b while drawing images on the electronic whiteboards is described with reference to FIG. 1. FIG. 1 is a schematic diagram illustrating an example of communication routes in the communication system 100, according to an embodiment. The "videoconference" may be called, for example, a "teleconference" or a "remote conference". In this disclosure, a description is given of an example in which the communication system 100 is used in the videoconference. In another example, the communication system 100 is used in a meeting or as casual conversation among users at different sites.

The communication system 100 includes a plurality of electronic whiteboards including the electronic whiteboard 1a and the electronic whiteboard 1b, a relay device 3, a communication management system 5, and an image storage device 7.

The electronic whiteboard 1a and the electronic whiteboard 1b are terminals that perform interactive or mutual communication of video data and audio data for calls and content data such as image data and stroke data for sharing. The electronic whiteboard is also called as an interactive white board (IWB).

Although in the example of FIG. 1, the communication system 100 includes the two electronic whiteboards, i.e., the electronic whiteboard 1a and the electronic whiteboard 1b, in another example, the communication system includes three or more electronic whiteboards. In the following description, any arbitrary one of the electronic whiteboards included in the communication system 100 is referred to as an "electronic whiteboard 1", to simplify the description.

The electronic whiteboard 1 is an example of a terminal apparatus used in the communication system 100. In another example, the terminal apparatus may be a videoconference terminal used for a videoconference, or an information terminal such as a personal computer (PC), a tablet terminal, or a smartphone, each being installed with an application program that supports the communication system 100.

The stroke data is data necessary for reproducing a stroke image. The stroke data includes, but not limited to, coordinate data, line width data, line color data, vector data, etc. The electronic whiteboards 1 and the electronic whiteboard 1b exchanges video data and audio data for a call with each other, to reproduce video and sound of the communication counterpart, thereby making a remote video call.

The electronic whiteboard 1a and the electronic whiteboard 1b exchange image data of a document image to be shared, thereby allowing users using the communication system 100 to share the same document image. The document image is an image displayed on the display of the electronic whiteboard 1. Examples of the document image include, but not limited to, an image of a document for a conference, a background image displayed on the display, a capture screen when the display screen is captured.

Further, the electronic whiteboard 1a and the electronic whiteboard 1b exchange stroke data of a stroke image to be shared, thereby allowing participants using the communication system to share the same stroke image. The stroke image is a line or the like drawn by a user with a handwritten stroke with an electronic pen or the like. The stroke image is displayed by stroke data indicating points that indicate coordinates on the display.

FIG. 1 illustrates an electronic whiteboard equipped with a videoconferencing function as an example of the electronic whiteboard 1a and the electronic whiteboard 1b. Note that the image of the video data can be either a moving image or a still image.

In the following description, the electronic whiteboard 1 as a request source that requests the start of a videoconference is referred to as a "source terminal". The electronic whiteboard 1 as a destination (relay destination) of the request is referred to as a "destination terminal". For example, in FIG. 1, when the electronic whiteboard 1a requests the start of the videoconference to the electronic whiteboard 1b, the electronic whiteboard 1a is the source terminal and the electronic whiteboard 1b is the destination terminal. When the start of the videoconference is requested from the electronic whiteboard 1b, the electronic whiteboard 1b is the source terminal and the electronic whiteboard 1a is the destination terminal. Note that the electronic whiteboard 1a and the electronic whiteboard 1b may be used not only for communication between different offices or for communication between different rooms in the same office, but also for communication within the same room or for outdoor-indoor communication or outdoor-outdoor communication.

The relay device 3, which is implemented by one or more computers, performs a process of relaying content data for a call between the electronic whiteboard 1a and the electronic whiteboard 1b.

The communication management system 5 is implemented by one or more computers. The communication management system 5 centrally controls authentication for login from the electronic whiteboard 1a and the electronic whiteboard 1b, management of the communication status of the electronic whiteboard 1a and the electronic whiteboard 1b, management of a destination list, the communication status of the relay device 3, and the like. Further, the communication management system 5 relays stroke data to be shared between the electronic whiteboard 1a and the electronic whiteboard 1b.

The image storage device 7, which is implemented by one or more computers, stores image data of a document image to be shared, the image data being uploaded from the electronic whiteboard 1a, and being downloaded to the electronic whiteboard 1b, and vice versa. In other words, the image storage device 7 stores the image data uploaded from the electronic whiteboard 1b, which is to be downloaded to the electronic whiteboard 1a.

In one example, each of the relay device 3, the communication management system 5, and the image storage device 7 is configured as a single computer. In another example, each of the relay device 3, the communication management system 5, and the image storage device 7 is configured as a plurality of computers to which one or more units (functions or means) are arbitrarily allocated.

In the communication system 100 a management information session set for exchanging various types of management information is established between the electronic whiteboard 1a and the electronic whiteboard 1b through the communication management system 5. The management information session sei is hereinafter referred to as a "session sei". Further, four sessions are established between the electronic whiteboard 1a and the electronic whiteboard 1b to exchange four types of data including high resolution image data, medium resolution image data, low resolution image data, and audio data through the relay device 3. In FIG. 1, these four sessions are collectively illustrated as an image and audio data session sed. The image and audio data session is hereinafter referred to as a "communication session". Note that the communications session sed does not necessarily have to be four sessions and may have a smaller or larger number of sessions than the four sessions. In addition, the communication session may be established directly between the source terminal and the destination terminal without intervention of the relay device 3.

Further, in the communication system 100, stroke data can be exchanged between the electronic whiteboard 1a and the electronic whiteboard 1b using the session sei.

The description is now given of the resolution of video data to be processed in the present embodiment. For example, the low-resolution video data has, for example, 160 pixels in the horizontal direction and 120 pixels in the vertical direction. The low-resolution video data serves as a base image. The medium-resolution video data has 320 pixels in the horizontal direction and 240 pixels in the vertical direction. The high-resolution video data has, for example, 640 pixels in the horizontal direction and 480 pixels in the vertical direction. In a case where passing through a narrow band path, low-quality video data that only includes the low-resolution video data serving as the base image is relayed. In the case of a relatively wide band path, medium-quality image data including the low-resolution video data serving as the base image and the medium-resolution video data is relayed. In the case of a very wide band path, high-quality video data including the low-resolution video data serving as the base image, the middle-quality video data, and the high-quality video data is relayed. Since the audio data has a smaller data size than the video data, audio data is relayed even on the narrow hand path.

Figure 2:
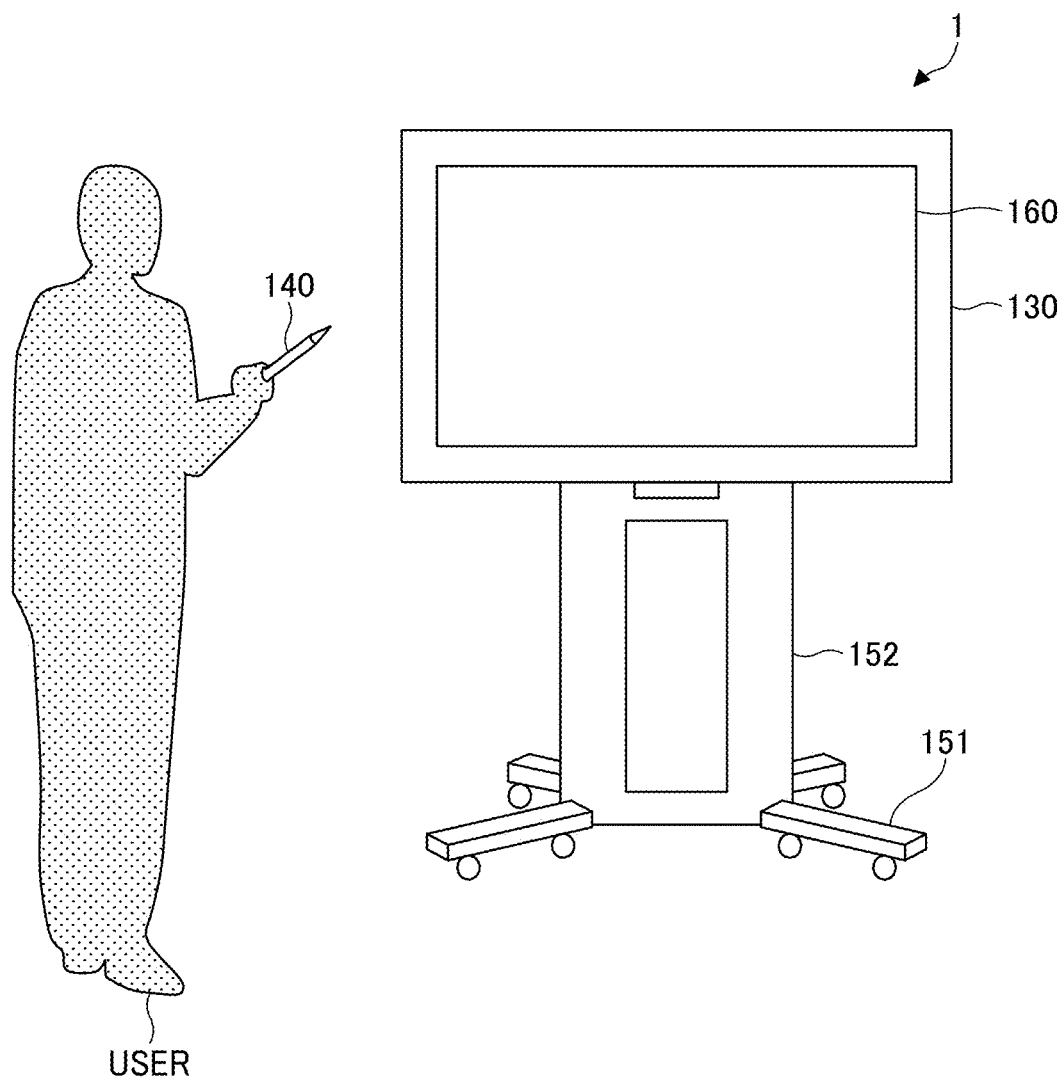
FIG. 2 is an illustration for explaining an example of how an electronic whiteboard is used, according to an embodiment of the present disclosure.

FIG. 2 is an illustration for explaining an example of how an electronic whiteboard is used. As illustrated in FIG. 2, the electronic whiteboard 1 includes a plurality of legs 151 each having a plurality of casters on the lower side, a support 152 provided on the upper side of the legs 151, and a main body 153 of the electronic whiteboard 1 provided on top of the support 152, and a display 160 provided on the front surface of the main body 153. The main body 153 includes a central processing unit (CPU) 101 described below. The user can input (draw) a stroke image such as characters on the display 160 using an electronic pen 140 or the like.

Hardware Configuration:

A description is given hereinafter of a hardware configuration of each device, according to the present embodiment.

Figure 3:
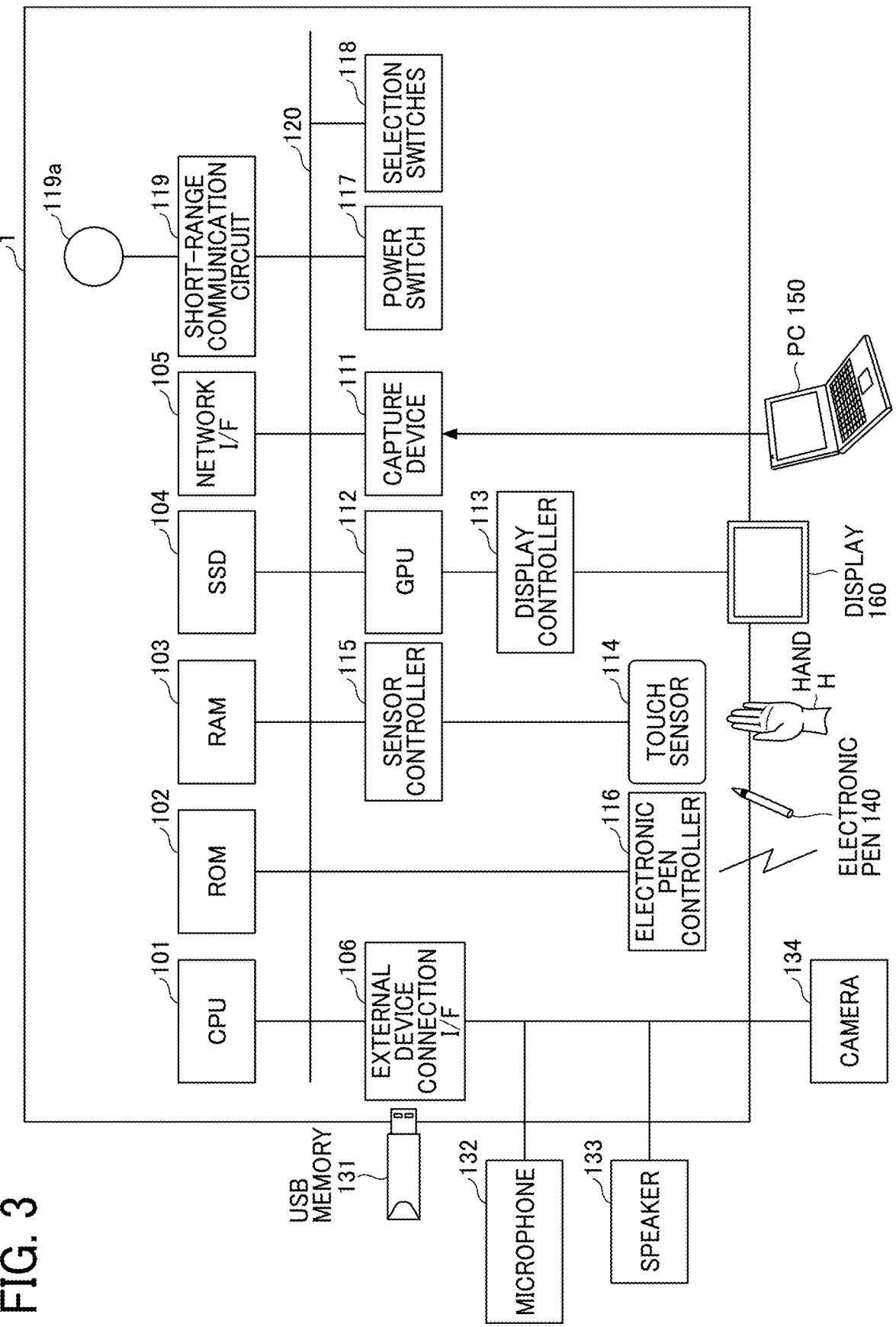
FIG. 3 is a block diagram illustrating an example of a hardware configuration of die electronic whiteboard, according to an embodiment of the present disclosure.

Hardware Configuration of Electronic Whiteboard:

FIG. 3 is a block diagram illustrating an example of a hardware configuration of the electronic whiteboard, according to an embodiment. The electronic whiteboard 1 is an example of a terminal apparatus.

As illustrated in FIG. 3, the electronic whiteboard 1 includes, but not limited to, a CPU 101, a read only memory (ROM) 102, a random access memory (RAM) 103, a solid state drive (SSD) 104, a network interface (I/F) 105, and an external device connection I/F 106.

The CPU 101 is a processor that controls entire operation of the electronic whiteboard 1. The ROM 102 is a non-volatile memory in which programs such as an initial program loader (IPL) used for booting the CPU 101 are stored. The RAM 103 is a volatile memory used as a work area for the CPU 101. The SSD 104 is a nonvolatile large-capacity storage device that stores various data such as programs for the electronic whiteboard 1.

The network I/F 105 is a communication interface for connecting the electronic whiteboard 1 to a communication network through which the electronic whiteboard 1 perform communication. The external device connection I/F 106 is an interface for connecting the electronic whiteboard 1 to various extraneous sources. Examples of the extraneous sources include a universal serial bus (USB) memory 131 and external devices (a microphone 132, a speaker 133, and a camera 134).

The electronic whiteboard 1 further includes a capture device 111, a graphics processing unit (GPU) 112, a display controller 113, a contact sensor 114, a sensor controller 115, an electronic pen controller 116, a short-range communication circuit 119, and an antenna 119a for the short-range communication circuit 119, a power switch 117, and selection switches 118.

The capture device 111 captures (acquires) a display screen displayed on a display of a PC 150, which is external to the electronic whiteboard 1, as a still image or a moving image. The GPU 112 is a semiconductor chip (processor) dedicated to processing a graphical image. The display controller 113 controls display of an image processed at the GPU 112 for output through the display 160. The contact sensor 114 detects a touch onto the display 160 with the electronic pen 140 or a user's hand H. The sensor controller 115 controls operation of the contact sensor 114.

The contact sensor 114 inputs and senses a coordinate using the infrared blocking system. More specifically, the display 160 is provided with two light receiving elements disposed on both upper side ends of the display 160, and a reflector frame surrounding the sides of the display 160. The light receiving elements emit a plurality of infrared rays in parallel to a surface of the display 160. The light receiving elements receive lights passing in the direction that is the same as an optical path of the emitted infrared rays, which are reflected by the reflector frame. The contact sensor 114 outputs an identifier (ID) of the infrared ray that is blocked by an object (such as the user's hand) after being emitted from the two light receiving elements, to the sensor controller 115. Based on the ID of the infrared ray, the sensor controller 115 detects a specific coordinate that is touched by the object. The electronic pen controller 116 communicates with the electronic pen 140 to detect a touch by using the tip or bottom of the electronic pen 140 to the display 160. The short-range communication circuit 119 is a communication circuit that performs short-range wireless communication in compliance with the near field communication (NFC), the Bluetooth (Registered Trademark), and the like.

The power switch 117 is a switch that turns on or off the power of the electronic whiteboard 1. The selection switches 118 are a group of switches for adjusting brightness, hue, etc., of display on the display 160, for example.

The electronic whiteboard 1 further includes a bus line 120. The bus line 120 includes an address bus, a data bus, and various control signals, etc., for electrically connecting the elements such as the CPU 101 illustrated in FIG. 3.

The contact sensor 114 is not limited to the infrared blocking system type, and may be a different type of detector, such as a capacitance touch panel that identifies a contact position by detecting a change in capacitance, or a resistance film touch panel that identifies a contact position by detecting a change in voltage of two opposed resistance films. In another example, the contact sensor 114 may use an electromagnetic induction touch panel that identifies a contact position by detecting electromagnetic induction caused by contact of an object to a display. In addition to or in alternative to detecting a touch by the tip or bottom of the electronic pen 140, the electronic pen controller 116 may also detect a touch by another part of the electronic pen 140, such as a part held by a hand of the user.

Figure 4:
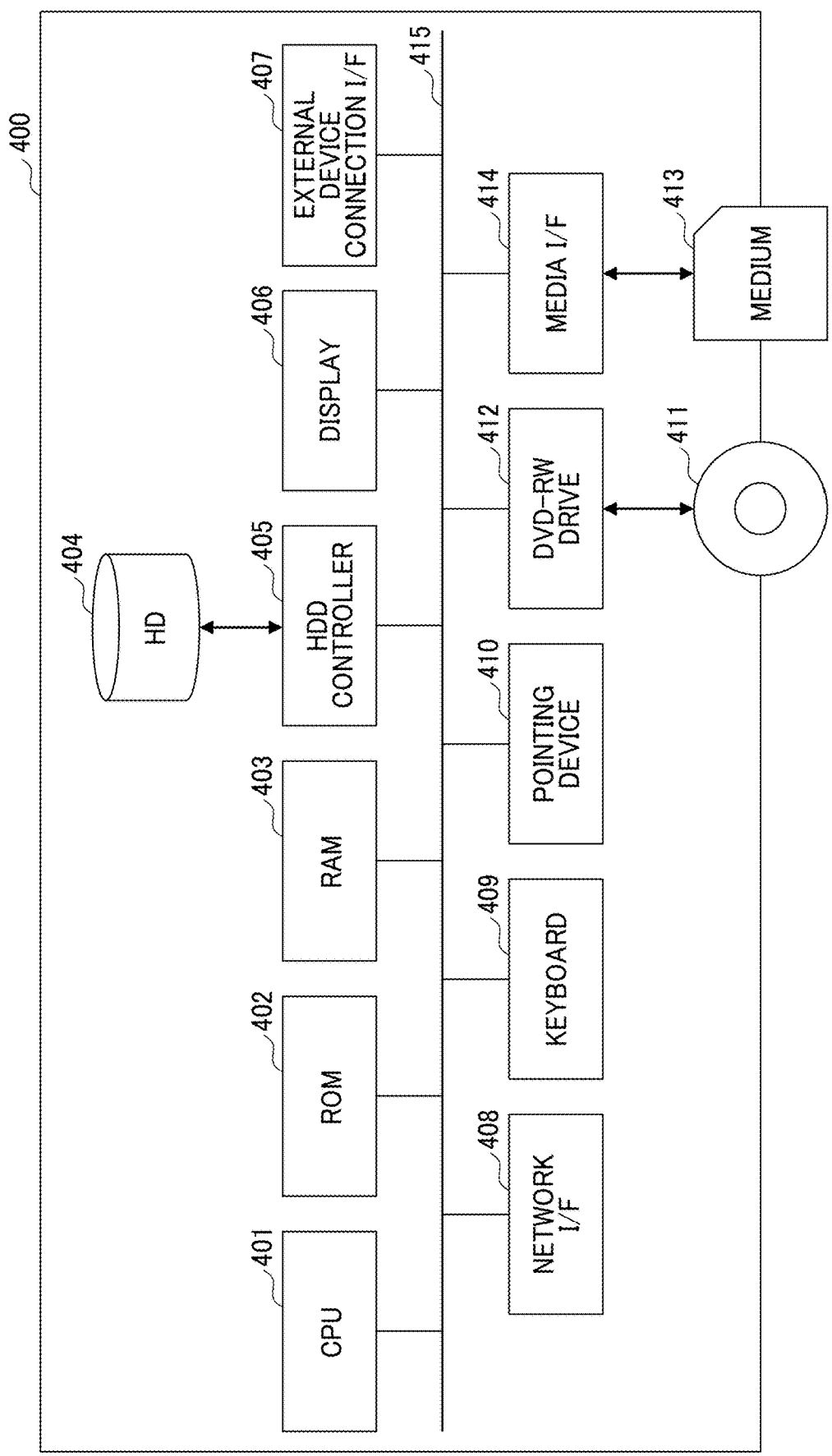
FIG. 4 is a block diagram illustrating a hardware configuration of a computer, according to an embodiment of the present disclosure.

Hardware Configuration of Management Apparatus, Relay Device, Image Storage Device, and PC:

Each of the communication management system 5, the relay device 3, the image storage device 7, and the PC 150 have a hardware configuration of a computer 400 as illustrated in FIG. 4, for example. Alternatively, any one or more of the communication management system 5, the relay device 3, and the image storage device 7 may be implemented by a plurality of computers 400.

FIG. 4 is a block diagram illustrating the hardware configuration of the computer 400, according to an embodiment of the present disclosure. The computer 400 includes, but not limited to, a CPU 401, ROM 402, a RAM 403, a hard disk (HD) 404, a hard disk drive (HDD) controller 405, a display 406, an external device connection I/F 407, a network 408, a keyboard 409, a pointing device 410, a digital versatile disk-rewritable (DVD-RW) drive 412, a media I/F 414, a bus line 415.

The CPU 401 is a processor that controls entire operation of the computer 400. The ROM 402 is a nonvolatile memory in which programs such as an IPL used for booting the CPU 401. The RAM 403 is a volatile memory used as a work area for the CPU 401. The HD 404 is a mass storage device that stores an operating system (OS), programs such as applications, and various types of data. The HDD controller 405 controls reading and writing of various data from and to the HD 404 under control of the CPU 401.

The display 406 is a display device that displays various information such as a cursor, menu, window, character, or image. The external device connection I/F 407 is an interface that connects the computer 400 to various extraneous sources. The network I/F 408 is a communication interface that controls communication of data through a communication network. The keyboard 409 is one example of an input device provided with a plurality of keys for allowing a user to input characters, numerals, or various instructions. The pointing device 410 is an example of an input device that allows a user to select or execute a specific instruction, select a target for processing, or move a cursor being displayed.

The DVD-RW drive 412 controls reading or writing (storing) of data from or to the DVD-RW 411. Alternatively, the DVD-RW drive 412 may control the reading or writing (storing) of data from or to a disc such as a Blu-ray Disc Rewritable (BD-RE) instead of the DVD-RW 411. The media I/F 414 controls reading or writing (storing) of data from or to a medium 413 such as a flash memory. The bus line 415 includes an address bus, a data bus, and various control signals, etc., for electrically connecting the elements such as the CPU 401 illustrated in FIG. 4.

When the computer 400 is the communication management system 5, the HD 404 stores various types of data such as a communication control program. When the computer 400 is the relay device 3, the HD 404 stores various types of data such as a relay control program. Further, when the computer 400 is the image storage device 7, the HD 404 stores various types of data such as an image storage control program.

Figure 5:
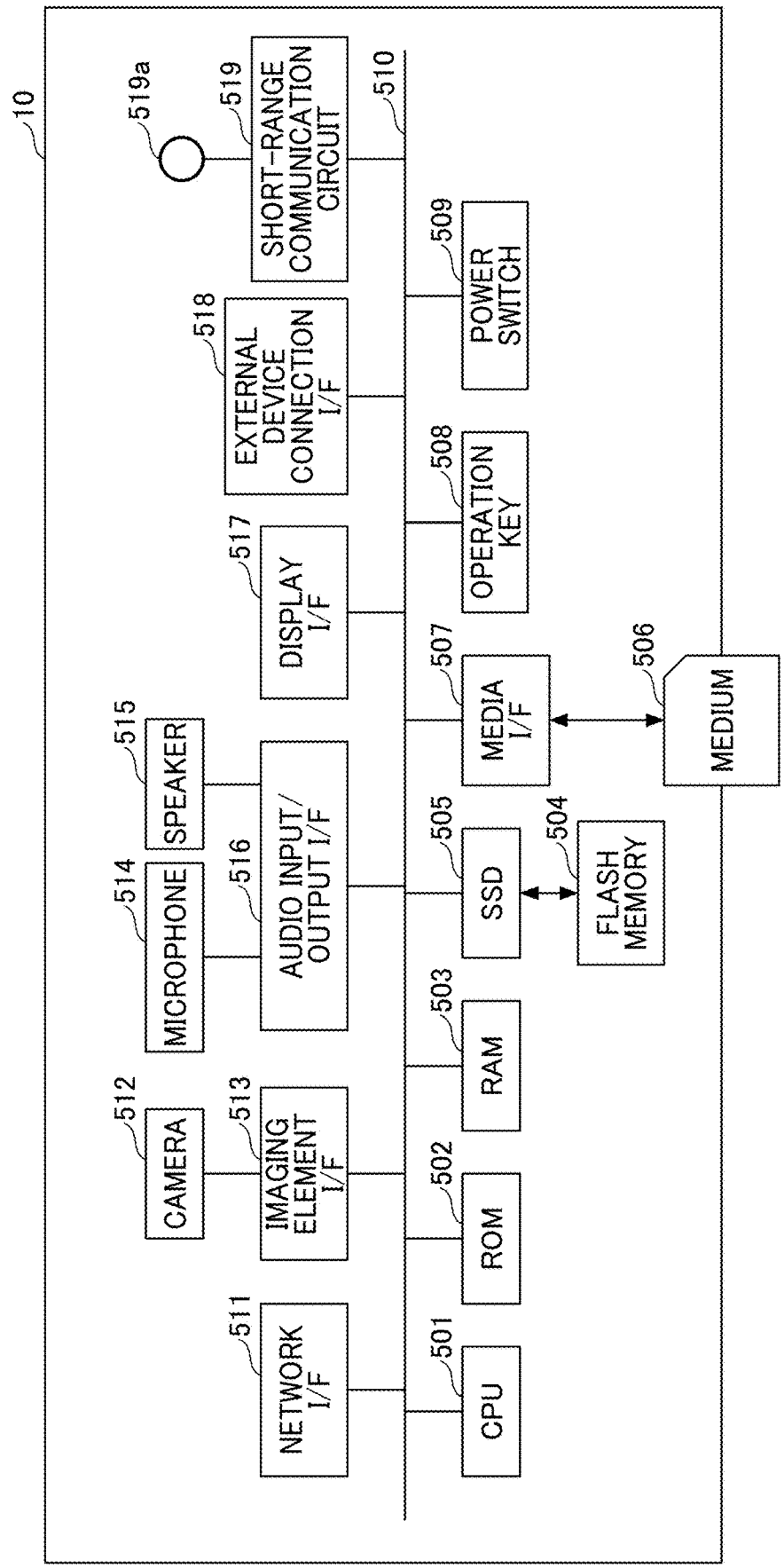
FIG. 5 is a block diagram illustrating a hardware configuration of a videoconference terminal, according to an embodiment of the present disclosure.

Hardware Configuration of Videoconference Terminal:

FIG. 5 is a block diagram illustrating a hardware configuration of the videoconference terminal 10, according to an embodiment. The videoconference terminal 10 has a configuration of a computer, and includes, for example, a CPU 501, a ROM 502, a RAM 503, a flash memory 504, and an SSD 505. The videoconference terminal 10 further includes, but not limited to, a media I/F 507, an operation key 508, a power switch 509, a network I/F 511, a camera 512, an imaging element I/F 513, a microphone 514, a speaker 515, and an audio input/output I/F 516. The videoconference terminal 10 further includes, but not limited to, a display I/F 517, an external device connection I/F 518, a short-range communication circuit 519, an antenna 519a for the short-range communication circuit 519, and a bus line 510.

The CPU 501 is a processor that reads out programs or data from the ROM 502, the flash memory 504 or the like, and executes processing according to the programs or data to implement functions of the videoconference terminal 10. The ROM 502 is a non-volatile memory in which programs such as an IPL used for hooting the CPU 501 are stored in advance. The RAM 503 is a volatile memory used as a work area for the CPU 501.

The flash memory 504 is a storage device that stores an OS, application programs, and various types of data. The SSD 505 controls reading or writing of various data from or to the flash memory 504 under control of the CPU 501. The media I/F 507 controls, for example, reading or writing (storing) data from or to a medium 506 such as a memory card.

The operation key 508 is an input device that receives an input operation from a user operating the videoconference terminal 10. The power switch 509 is a switch that turns on or off the power of the videoconference terminal 10. The network I/F 511 is a communication interlace that controls communication through a communication network.

The camera 512 is an imaging device for capturing an image of a subject under the control of the CPU 501. The imaging element I/F 513 controls image capturing by the camera 512 and converts data of the captured image into predetermined image data (video data). The microphone 514 converts collected sound into electric signals. The speaker 515 converts audio signals into sound, and outputs the sound. The audio input/output I/F 516 controls input and output of sound by the microphone 514 and the speaker 515.

The display I/F 517 outputs the image data to a display device such as a display connected to the display I/F 517 under control of the CPU 501. The external device connection I/F 518 is an interface circuit that connects the videoconference terminal 10 to various external devices. The short-range communication circuit 519 is a communication circuit that performs short-range wireless communication in compliance with the NFC, the Bluetooth (registered trademark) and the like via the antenna 519a. The bus line 510 is connected to each of the above-described hardware elements, and transmits an address signal, a data signal, various control signals, or the like.

The medium 506 is various types of a storage medium such as a memory card. The medium 506 is removable from the videoconference terminal 10.

First Embodiment

Configuration of Information Processing System:

A description is given now of a configuration of an information processing system 600, according to a first embodiment.

Figure 6:
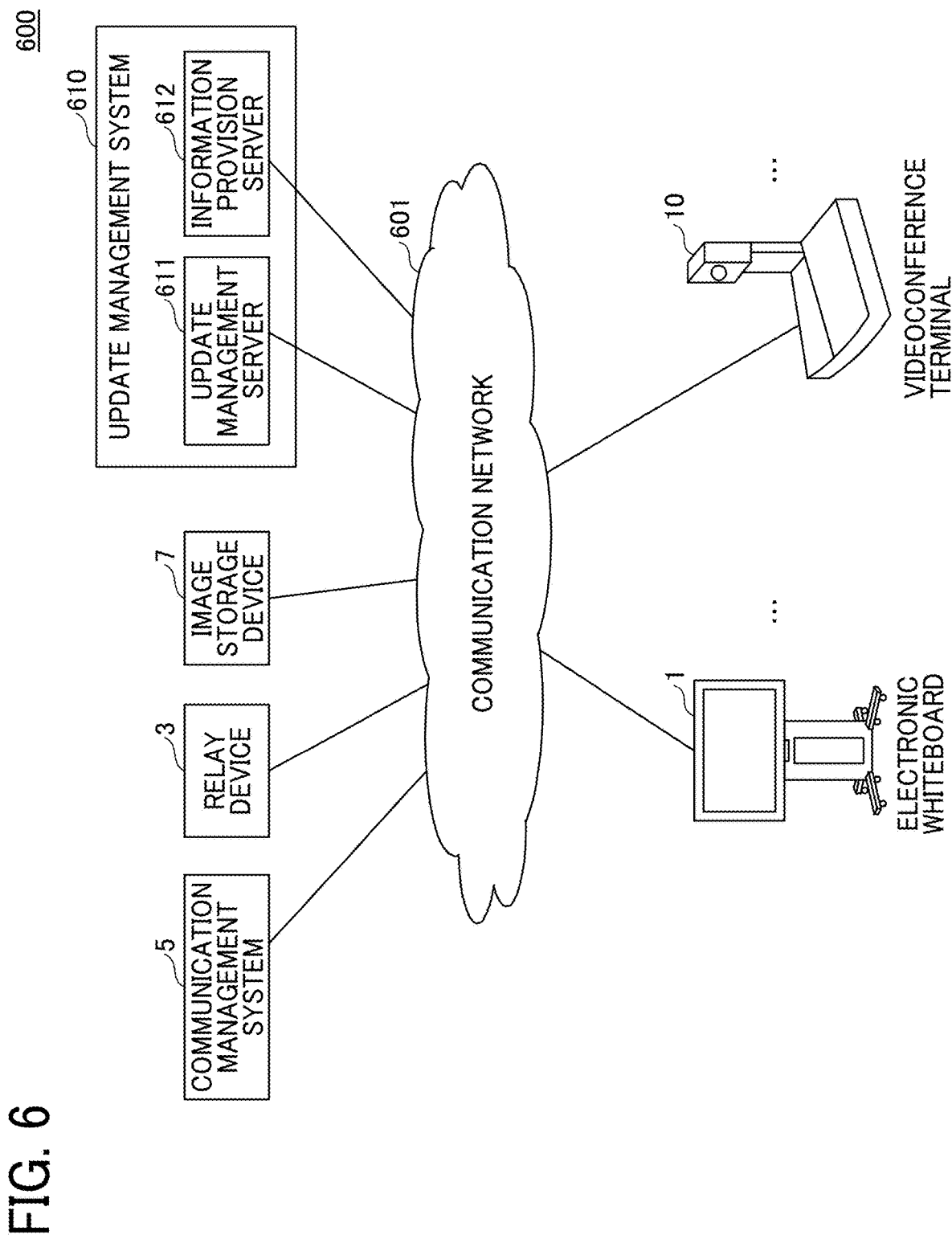
FIG. 6 is a diagram illustrating an example of a system configuration of an information processing system, according to a first embodiment of the present disclosure.

FIG. 6 is a diagram illustrating an example of a system configuration of the information processing system 600, according to the first embodiment. The information processing system 600 includes, but not limited to, an update management server 611 and an information provision server 612, in addition to the communication system 100 described above with reference to FIG. 1 to FIG. 5. Each of the update management server 611 and the information provision server 612 is communicatively connected to the communication system 100 through the communication network 601. For example, the update management server 611 and the information provision server 612 is configured as one update management system 610. In another example, the update management server 611 and the information provision server 612 may be a system implemented by a plurality of computers.

The information processing system 600 is a system that updates a plurality of programs installed in an information processing apparatus used by a plurality of users such as the electronic whiteboard 1 and the videoconference terminal 10.

In the following description, an example is described in which the information processing apparatus installed with programs to be updated by the information processing system 600 is the electronic whiteboard 1. However, the electronic whiteboard 1 is just an example, and the information processing apparatus may be any suitable apparatus, provided that it executes a plurality of programs. For example, the information processing apparatus may, be the videoconference terminal 10, the communication management system 5, the relay device 3, and the image storage device 7 illustrated in FIG. 6. Further, the information processing apparatus may be, for example, an output device such as a projector (PJ), a digital signage, a head up display (HUD), an industrial machine, an imaging device, a sound collecting device, a medical device, a network home appliance, and a car (connected car). Furthermore, the information processing apparatus may be, for example, an information terminal such as a laptop computer, a mobile phone, a smartphone, a tablet terminal, a game machine, a personal digital assistant (PDA), a digital camera, a wearable PC, and a desktop PC.

In addition, the information processing system 600 can be without at least one of the communication management system 5, the relay device 3, and the image storage device 7.

The update management server 611 is, for example, an information processing apparatus having the configuration of the computer 400 as illustrated in FIG. 4 or a system including a plurality of information processing apparatuses. The update management server 611 stores and manages, in a memory or the like, an electronic file (hereinafter referred to as an "update file") such as update information, an update control program, and an installer, which are for updating a plurality of programs executed by the electronic whiteboard 1 (an example of the information processing apparatus). Further, the update management server 611 provides an entirety or a part of the update file to the electronic whiteboard 1 in response to a request from the electronic whiteboard 1.

The electronic whiteboard 1 acquires the update file from the update management server 611, at a preset time zone such as nighttime, or at a date and time notified from the update management server 611, to perform a plurality of update processes for updating the plurality of programs executed by the electronic whiteboard 1.

However, with such configuration, when the update of one or more programs fails, there may be a case in which the electronic whiteboard 1 does not operate normally due to dependency between the plurality of programs, in a similar manner as the related art.

FIG. 7 is a diagram for describing the dependency between a plurality of installers, according to an embodiment. In FIG. 7, "TYPE" indicates a type of an installer (update program). "ID" is identification information that identifies the installer. "DEPENDENCY" is information indicating the dependency between each installer and another installer.

The example of FIG. 7 indicates that an "application installer" has a dependency relationship with a "driver installer", and that the "driver installer" has a dependency relationship with the "application installer".

For example, when it is said that the "application installer" has the dependency relationship with the "driver installer", what is meant is that in order to have an application that is to be installed by the "application installer" operate normally, an installation of a driver to be installed by the "driver installer" has to be successful. In substantially the same manner, when it is said that the "driver installer" has the dependency relationship with the "application installer", what is meant is that in order to have the driver that is to be installed by the "driver installer" operate normally, an installation of the application to be installed by the "application installer" has to be successful.

Therefore, when the information processing system 600 uses the three types of installers of FIG. 7 to execute update processing of the electronic whiteboard 1 and the driver installation fails, the application may not operate normally even when the update of the application is successful. In substantially the same manner, when the application installation fails, the driver may not operate normally even when the update of the driver is successful.

However, since the electronic whiteboard 1 is a terminal device shared by a plurality of users, it is undesirable that the electronic whiteboard 1 does not operate normally when a user activates the electronic whiteboard 1 on the day after the update, for example.

To address such issue, the information processing system 600 according to the present embodiment includes the information provision server 612 that provides information, an electronic file, etc., for restoring the electronic whiteboard 1 to a normal operating state, when the electronic whiteboard 1 fails to update one or more programs, for example.

The information provision server 612 is, for example, an information processing apparatus having the configuration of the computer 400 as illustrated in FIG. 4 or a system including a plurality of information processing apparatuses. The information provision server 612 stores and manages, in a memory or the like, recovery information and an electronic file (hereinafter referred to as an "recovery file"), which are for restoring the electronic whiteboard 1 to function normally, when the electronic whiteboard 1 fails to update one or more programs, for example. Further, the information provision server 612 provides the electronic whiteboard 1 with a part of or the entirety of the recovery file for restoring the electronic whiteboard 1 to function normally in response to a request from the electronic whiteboard 1.

The electronic whiteboard 1 acquires the information, the electronic file, etc., for restoring, the electronic whiteboard 1 to a normal operating state from the information provision server 612 when the update of one or more programs fails, to perform recovery processing. A detailed description is given below of the recovery processing.

Thus, according to the information processing system 600 according to the present embodiment, even when the updating of the plurality of programs executed by the electronic whiteboard 1 fails, the recovery processing is performed by which the electronic whiteboard 1 operates normally when activated next time.

Figure 8:
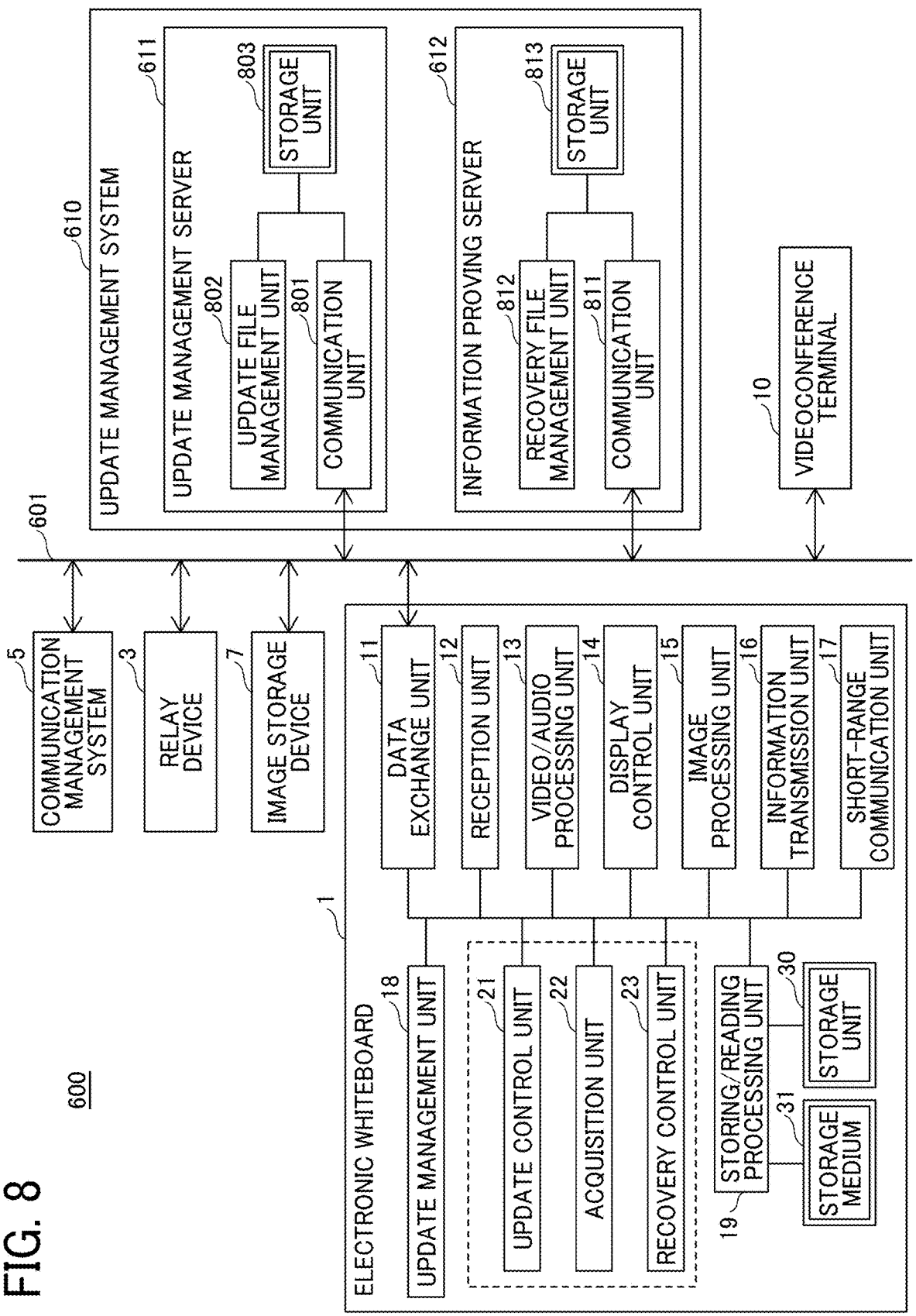
FIG. 8 is a diagram illustrating an example of a functional configuration of the information processing system, according to the first embodiment of the present disclosure.

Functional Configuration:

FIG. 8 is a diagram illustrating an example of a functional configuration of an information processing system 600, according to the first embodiment. In the following description, an example is described in which the information processing apparatus installed with programs to be updated is the electronic whiteboard 1. However, the electronic whiteboard is just one example, and the information processing device installed with programs to be updated is any other suitable information processing apparatus that executes a plurality of programs, such as the videoconference terminal 10, the communication management system 5, the relay device 3, and the image storage device 7.

Functional Configuration of Update Management Server:

The update management server 611 includes a communication unit 801 and an update file management unit 802, each being implemented by executing a predetermined program by the CPU 401 of FIG. 4, for example. Note that at least a part of the communication unit 801 and the update file management unit 802 may be implemented by hardware. The update management server 611 further includes a storage unit 803, which is implemented by, for example, the HD 404, the HDD controller 405, the RAM 403, etc. of FIG. 4.

The communication unit 801, which is implemented by, for example, a program executed by the CPU 401 of FIG. 4 and a network I/F 408, connects the update management server 611 to the communication network 601 to communicate with the information processing apparatus such as the electronic whiteboard 1.

The update file management unit 802 stores and manages, for example, the update file for updating the plurality of programs executed by the electronic whiteboard 1 in the storage unit 803. The update file is prepared in advance by, or example, a provider who provides the electronic whiteboard 1.

Figures 9A, 9B:
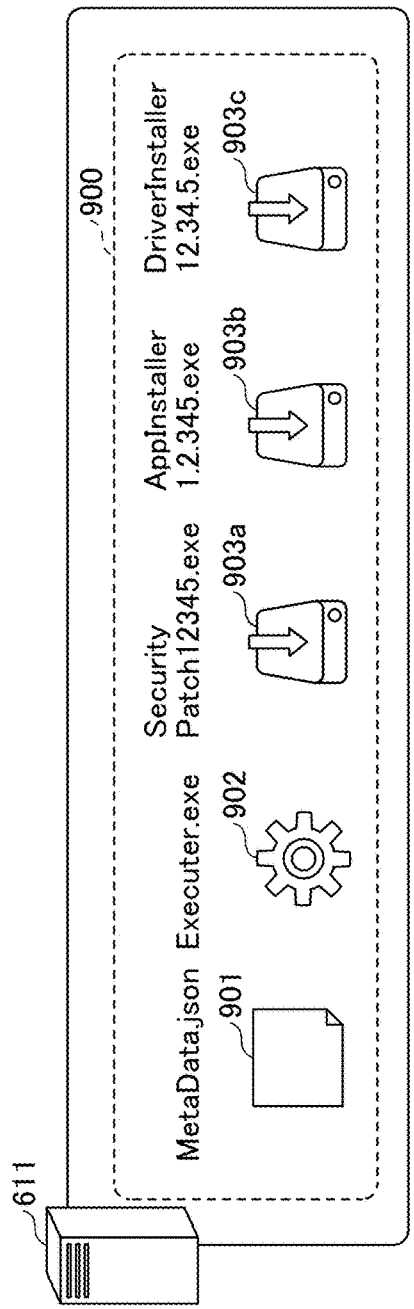
FIG. 9A is a diagram illustrating an example of an update file, according to the first embodiment of the present disclosure.
FIG. 9B is a diagram illustrating an example of update information, according to the first embodiment of the present disclosure.

FIG. 9A illustrates an example of the update file 900 managed by the update file management unit 802. In the example of FIG. 9A, the update file 900 includes update information 901, an update control program 902, a plurality of installers including an installer 903a, an installer 903b, and an installer 903c. In the following description, any arbitrary one or more of the plurality of installers including the installer 903a, the installer 903b, and the installer 903c is referred to as an "installer 903" or "installers 903", to simplify the description.

The update information 901 is, for example, an electronic file in which information required for updating a plurality of programs of the electronic whiteboard 1 is stored. In the example of FIG. 9A, a file name "MetaData.json" is assigned to the update information 901. FIG. 9B illustrates an example of the update information 901.

In the example of FIG. 9B, the update information 901 includes OS update patch installer information 911, application installer information 912, driver installer information 913, which are used for updating a plurality of programs of the electronic whiteboard 1.

In the example of FIG. 9B, the OS update patch installer information 911 includes information such as "type", "version", and "url". The "type" is information indicating a type of the installer 903. The "version" is information indicating a version of the installer 903 or a program installed by the installer 903. The "url" is information indicating a source from which the installer 903 is acquired and a filename of the installer 903.

Further, in the example of FIG. 9B, each of the application installer information 912 and the driver installer information 913 includes information of "dependency" in addition to the information of "type", "version", and "url". The information of "dependency" is information indicating the dependency relationship between the installers 903 described above with reference to FIG. 7.

In the example of FIG. 9B, the application installer information 912 defines that the installer 903b of an application has the dependency relationship with the installer 903c of a driver. In substantially the same manner, the driver installer information 913 defines that the installer 903c of the driver has the dependency relationship with the installer 903b of the application.

The update control program 902 is an application program that sequentially executes the installer 903a, the installer 903b, and the installer 903c, to update the program of the electronic whiteboard 1. In the example of FIG. 9A, a file name "Executer.exe" is assigned to the update control program 902.

The installer 903a of an OS update patch is a program for installing an update patch of the OS to the electronic whiteboard 1. In the example of FIG. 9A, the file name "SecurityPatch12345.exe" is assigned to the installer 903a. The installer 903b of the application is a program for installing the latest version (or updated version) of the application to the electronic whiteboard 1. In the example of FIG. 9A, a file name "AppInstaller1.2.345.exe" is given to the installer 903b. The installer 903c of the driver is a program for installing the latest version (or updated version) of the driver to the electronic whiteboard 1. In the example of FIG. 9A, a file name "DriverInstaller12.34.5.exe" is assumed to the installer 903c.

For example, the CPU 101 of in the electronic whiteboard 1 executes each installer 903, to perform an update process of the program corresponding to each installer 903. Further, each installer 903 has a function of uninstalling the corresponding program and a function of returning a failure reason with an error code when the installation fails.

The update file management unit 802 provides the electronic whiteboard 1 with the entirety or a part the update file 900 in response to a request from the electronic whiteboard for example. Further, when a new version of the update file 900 is released, the update file management unit 802 stores and manages the new version of the update file 900 in the storage unit 803, instead of the did version of the update file 900.

The types of installers 903 and the number of installers 903 included in the update file 900 illustrated in FIG. 9A are examples. The update file 900 may include any one or more suitable types and numbers of the installers 903.

Functional Configuration of Information Provision Server:

Referring again to FIG. 8, the information provision server 612 includes a communication unit 811 and a recovery file management unit 812, each being implemented by executing a predetermined program by the CPU 401 of FIG. 4, for example. Note that at least a part of the communication unit 811 and the recovery file management unit 812 may be implemented by hardware. The information provision server 612 further includes a storage unit 813, which is implemented by, for example, the HD 404, the HDD controller 405, the RAM 403, etc. of FIG. 4.

The communication unit 811, which is implemented by, for example, a program executed by the CPU 401 of FIG. 4 and a network I/F 408, connects the information provision server 612 to the communication network 601 to communicate with the information processing apparatus such as the electronic whiteboard 1.

The recovery file management unit 812 stores and manages, in the storage unit 813 or the like, the recovery file such as the recovery information and the electronic file, which are for restoring the electronic whiteboard 1 to function normally when the electronic whiteboard 1 fails to update one or more programs, for example.

Figures 10A, 10B:
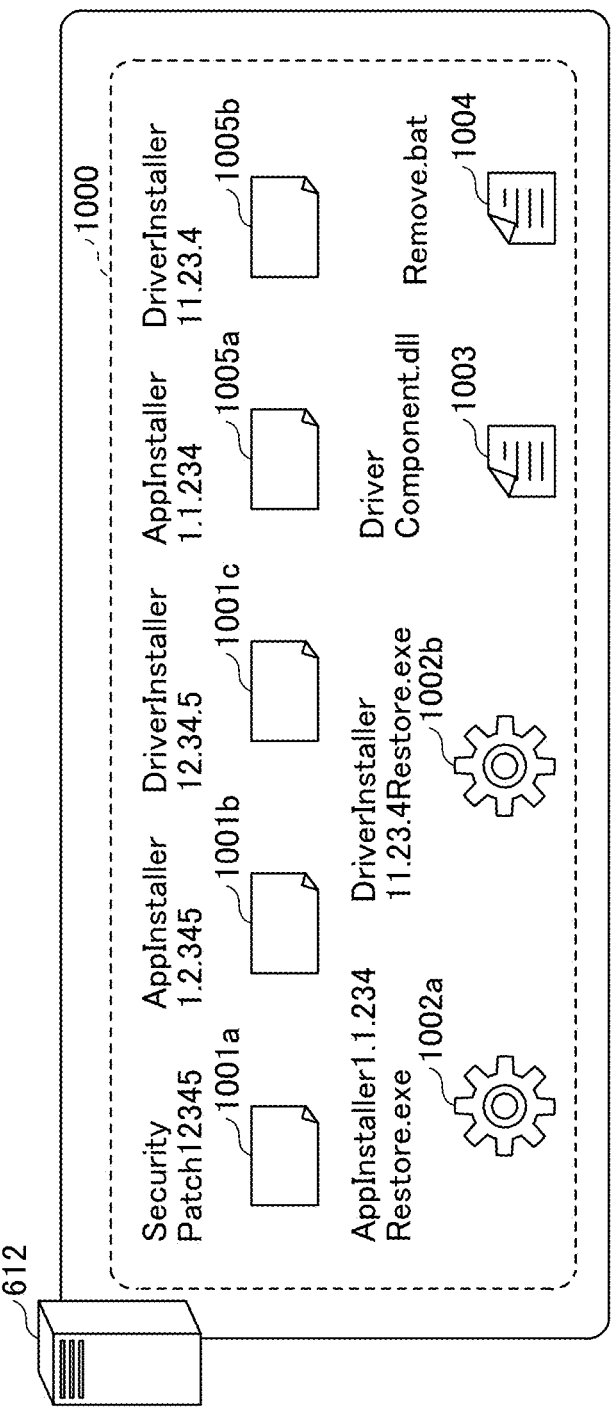
FIG. 10A is a diagram illustrating an example of a recovery file, according to the first embodiment of the present disclosure.
FIG. 10B is a diagram illustrating an example of information included in recovery information, according to the first embodiment of the present disclosure.

FIG. 10A illustrates an example of a recovery file 1000 managed by the recovery file management unit 812. In the example of FIG. 10A, the recovery file 1000 includes a plurality of pieces of recovery information including recovery information 1001a, recovery information 1001b, and recovery information 1001c, a plurality of recovery control programs including a recovery control program 1002a and a recovery control program 1002b, a dynamic link library (DLL) file 1003, and a batch file 1004. The recovery file 1000 may further include old version of recovery information 1005a and old version of recovery information 1005b.

In the following description, any arbitrary one of the plurality of pieces of recovery information including the recovery information 1001a, the recovery information 1001b, and the recovery information 1001c is referred to as "recovery information 1001", to simplify the description. Further, any arbitrary one of the plurality of recovery control programs including the recovery control program 1002a and the recovery control program 1002b is referred to as a "recovery control program 1002", to simplify the description. Furthermore, any arbitrary one of the old version of the recovery information 1005a and the old version the recovery information 1005b is referred to as "old version of recovery information 1005", to simplify the description.

The recovery information 1001 is information in which an error code to be output from an installer when updating of one or more programs of the electronic whiteboard 1 fails and a countermeasure corresponding to the error code are stored in advance. The recovery information 1001 is prepared in advance by, for example, a provider who provides the electronic whiteboard 1.

FIG. 10B illustrates an example of information included in the recovery information 1001. As illustrated in FIG. 10B, in the recovery information 1001, for each error code, the error code and the countermeasure corresponding to the error code is stored in association with each other. However, the recovery information 1001 does not have to be in a table format, and for example, the association between the error code and the countermeasure corresponding to the error code may be defined by character strings or the like.

The recovery control program 1002 is a program that recovers a program updated by the installer 903 and puts the program in an "update skip" status.

Figure 11:
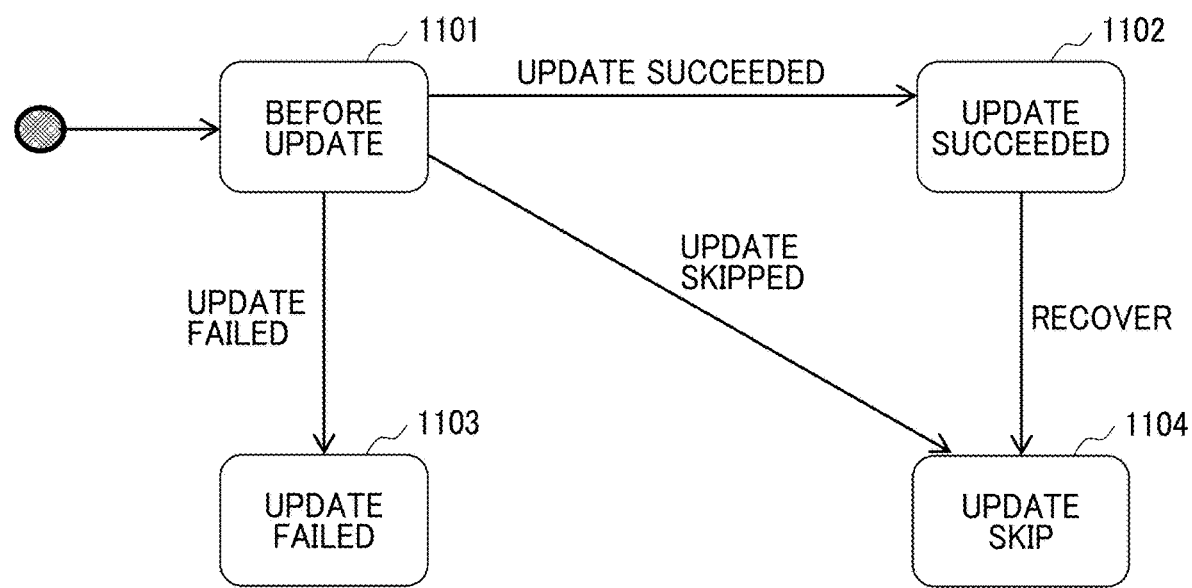
FIG. 11 is a diagram illustrating an example of status transition of a program, according to the first embodiment of the present disclosure.

FIG. 11 is a diagram illustrating an example of status transition of a program, according to the first embodiment. When the installer 903 is executed in a "before update" status 1101 and the program is successfully updated, the program transits to an "update succeeded" status 1102. Further, when the recovery control program 1002 in the "update succeeded" status 1102, the program transits to an "update skip" status 1104.

On the other hand, when the installer 903 is executed in the "before update" status 1101 and the update of the program is failed, the program transits to an "update failed" status 1103. Further, when the execution of the installer 903 is stopped in the "before update" status 1101 and thereby the update is skipped, the program transits to the "update skip" status 1104.

The DLL file 1003 is an example of an electronic file that the electronic whiteboard 1 needs to have in order to update the program. For example, when the program update fails because the DLL file 1003 which is required for the update, is damaged or missing, the installer 903 outputs an error code indicating that the DLL file 1003 does not exist. In this case, the DLL file 1003 is downloaded to the electronic whiteboard 1, and the installer 903 is re-executed (after being restarting as needed). This may result in the success in updating the program.

The batch file 1004 is an electronic file that describes processing of collectively executing a plurality of processes sequentially, for example. The electronic whiteboard 1 may execute the batch file 1004, to perform a series of processes required for the recovery of the program.

The old version of recovery information 1005 is the recovery information when the installation of the old version of the program fails. For example, in a case in which an error occurs when the recovery control program 1002 is executed to return the program to the status before the update, the recovery process is retried by referring to the old version of the recovery information 1005.

Functional Configuration of Electronic Whiteboard:

Referring again to FIG. 8, the electronic whiteboard 1 includes, but not limited to, a data exchange unit 11, a reception unit 12, a video/audio processing unit 13, a display control unit 14, an image processing unit 15, an information transmission unit 16, a short-range communication unit 17, an update management unit 18, a storing/reading processing unit 19, each being implemented by executing a predetermined program by the CPU 101 of FIG. 3, for example. The electronic whiteboard 1 further includes an update control unit 21, an acquisition unit 22, a recovery control unit 23, each being implemented by executing the update control program 902 described above by the CPU 101 of FIG. 3, for example. The electronic whiteboard 1 further includes a storage unit 30, which is implemented by, for example, the RAM 103, the SSD 104, etc., of FIG. 3, for example. Note that at least a part of the above functional units may be implemented by hardware.

The data exchange unit 11 exchanges various data (or information) with other terminals, apparatuses, systems, etc. through the communication network 601. The data exchange unit 11 also functions as a start unit, which performs a login process to the communication management system 5, and a process for starting communication with another terminal apparatus.

The reception unit 12 receives various inputs from the user using the electronic pen 140 or the like. For example, the reception unit 12 receives a designation operation for designating one or more stroke data to be operated, a change operation to stroke data, and a drawing operation of a stroke image.

The video/audio processing unit 13 performs main processing of the video conference function. For example, the video/audio processing unit 13 performs digital processing such as encoding of video data and audio data in accordance with the output signal of the microphone 132 and the output signal of the camera 134. The video/audio processing unit 13 generates a video signal and an audio signal based on video data and audio data received by the data exchange unit 11. Further, the video/audio processing unit 13 performs processing for combining video data having different resolutions.

The display control unit 14 outputs a video signal (image signal) or the like to the display 160, to perform control for displaying a display screen.

The image processing unit 15 performs main processing of an electronic whiteboard function. For example, the image processing unit 15 performs a process of creating a stroke image and stroke data based on the stroke of the electronic pen 140 or the like received by the reception unit 12 or a process of creating a stroke image based on the stroke data received by the data exchange unit 11. The image processing unit 15 further performs a process of creating an image signal based on image data of a document image received by the data exchange unit 11.

The information transmission unit 16 transmits the stroke data created by the image processing unit 15 to the communication management system 5. Further, in response to the designation operation that is received by the reception unit 12 and that designates one or more pieces of stroke data to be operated, the information transmission unit 16 transmits group operation information designating the one or more pieces of stroke data to the communication management system 5.

The short-range communication unit 17 acquires and provides data by short-range wireless communication with each terminal having a short-range communication unit.

The update management unit 18 manages updates of a plurality of programs executed by the electronic whiteboard 1 (an example of an information processing apparatus). For example, the update management unit 18 acquires the update file including an update control program from the update management system 610 at a date and time notified from the update management server 611, a predetermined time, or the like. For example, the update management unit 18 acquires the update information 901 as illustrated in FIG. 9B and the update control program 902 from the update management server 611, and acquires the plurality of installers including the installer 903a, the installer 903b, and the installer 903c, based on the acquired update information 901.

Further, the update management unit 18 executes the acquired update control program 902 and terminates the application of the electronic whiteboard 1, to start the update processes of the plurality of programs including the application.

The update control unit 21 is implemented by, for example, the update control program 902 executed by the CPU 101 of FIG. 3, and controls the execution of a plurality of update processes for updating the programs to be updated among programs executed by the electronic whiteboard 1. For example, the update control unit 21 sequentially executes the installer 903a, the installer 903b, and the installer 903c for installing programs to be updated to the electronic whiteboard 1.

Preferably, the update control unit 21 sequentially performs a plurality of update processes based on the update information 901 as illustrated in FIG. 9B, indicating the information on the installers 903 that update the plurality of programs and the dependency among the plurality of installers 903. Note that the update control unit 21 does not necessarily need to refer to the update information 901, which is external. In another example, the update control unit 21 may have the update information 901 or information equivalent to the update information 901 in advance.

The acquisition unit 22 is implemented by, for example, the update control program 902 executed by the CPU 101 of FIG. 3. When the update of one or more programs executed by one or more update processes from among the plurality of update processes whose execution are controlled by the update control unit 21, the acquisition unit 22 acquires the recovery information for recovering the function implemented by the program whose update is failed from the information provision server 612.

For example, when the update of the program by the installer 903b of the application among the installer 903a, the installer 903b, and the installer 903c whose execution are controlled by the update control unit 21 fails, the acquisition unit 22 acquires the recovery information 1001b of the application. Further, when the update of the program by the installer 903c of the driver fails, the acquisition unit 22 acquires the recovery information 1001c of the driver.

However, this is one example, and a plurality of pieces of recovery information including the recovery information 1001a, the recovery information 1001b, and the recovery information 1001c may be managed collectively as one piece of recovery information 1001. In this case, when the update of the program by any of the installers fails, the acquisition unit 22 acquires the one piece of recovery information 1001. In still another example, the acquisition unit 22 may acquire the recovery information (the plurality of pieces of recovery information including the recovery information 1001a, the recovery information 1001b, the recovery information 1001c, or the one pieces of recovery information 1001) before the update process of the program by the update control unit 21 or concurrently with the update process of the program by the update control unit 21.

The recovery control unit 23 executes a recovery process for recovering the function implemented by the program that has failed to be updated, based on the recovery information acquired by the acquisition unit 22. For example, the recovery information acquired by the acquisition unit 22 includes information indicating the association between the error code output by the installer and the countermeasure corresponding to the error code, as illustrated in FIG. 10B. The acquisition unit 22 executes the countermeasure corresponding to the error code output from the installer based on this association.

The illustration of FIG. 8 is one example of the functional configuration of the information processing system 600. For example, other information processing apparatuses than the electronic whiteboard 1, such as the videoconference terminal 10, the communication management system 5, the relay device 3, and the image storage device 7 may include the update management unit 18, the update control unit 21, the acquisition unit 22, the recovery control unit 23 and the like.

Further, the functional configurations of the update management server 611 and the information provision server 612 may be distributed over a larger number of information processing apparatuses, or may be implemented by one update management system 610.

<Processes>

A description is now given of a flow of update control processing, according to the first embodiment.

Figure 12:
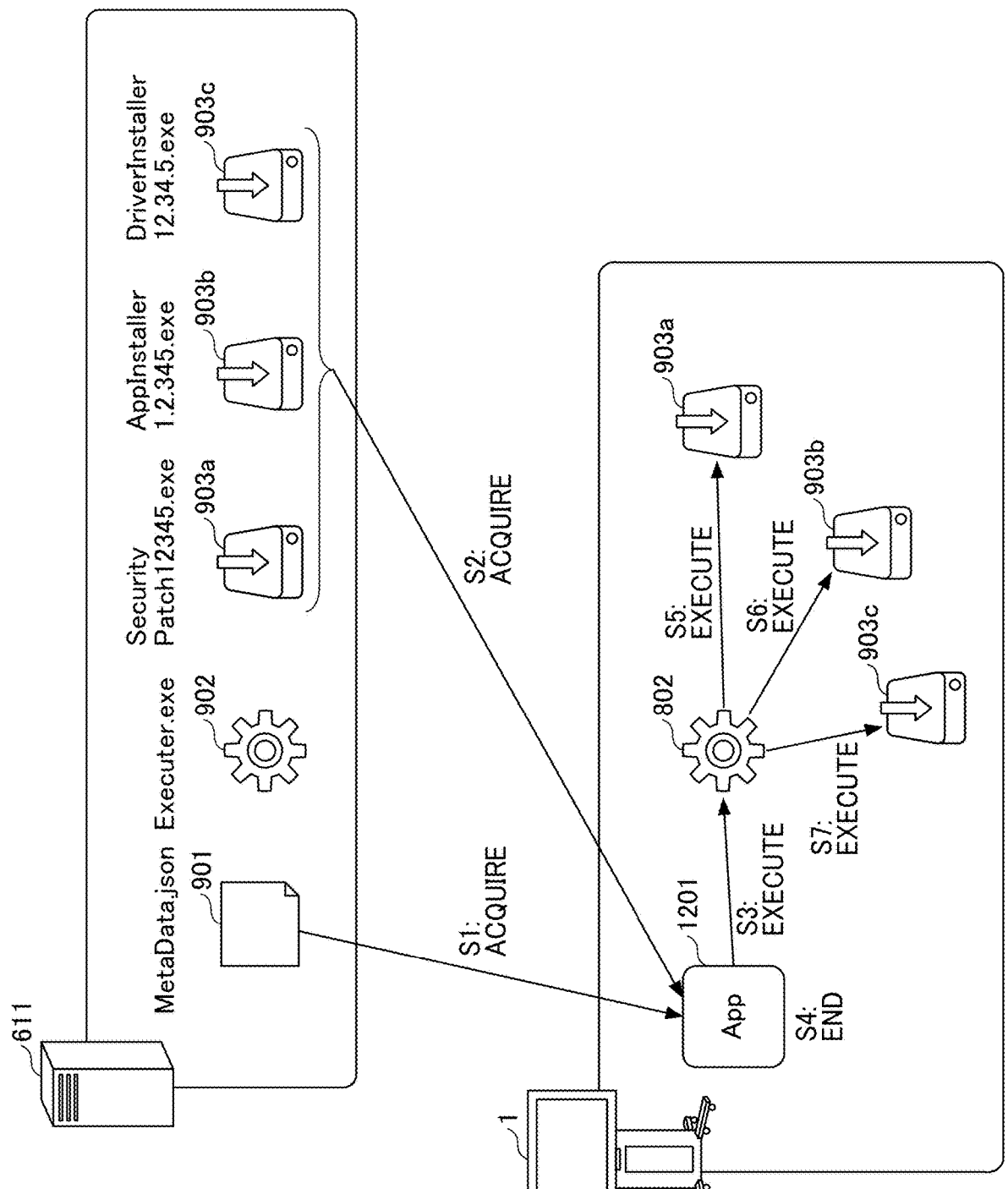
FIG. 12 is an illustration for explaining a flow of update processing, according to the first embodiment of the present disclosure.

Processing Flow:

FIG. 12 is an illustration for explaining a flow of update processing, according to the first embodiment. This processing is an example of update processes in which the update control unit 21 updates a plurality of programs to be updated among programs executed by the electronic whiteboard 1. In this example, the update control unit 21 of the electronic whiteboard 1 is implemented by an application 1201 executed by the CPU 101 of FIG. 3.

In step S1, the update control unit 21 implemented by the application 1201 of the electronic whiteboard 1 acquires the update information 901 as illustrated in FIG. 9B for example, from the update management server 611. This process may be performed, for example, at a date and time notified in advance from the update management server 611, or may be performed at a predetermined time such as at nighttime.

In step S2, the update control unit 21 acquires the plurality of installers including the installer 903*a*, the installer 903*a*, and the installer 903*c*, the update control program 902, and the like based on the acquired update information 901. In another example, the update control unit 21 may acquire the update control program 902 together with the update information 901 in step S1.

Further, the update control unit 21 executes the acquired update control program 902 in step S3, and terminates the application 1201 in step S4. Thus, the update processing of the application 1201 is executed by the update control program 902.

Figure 13:
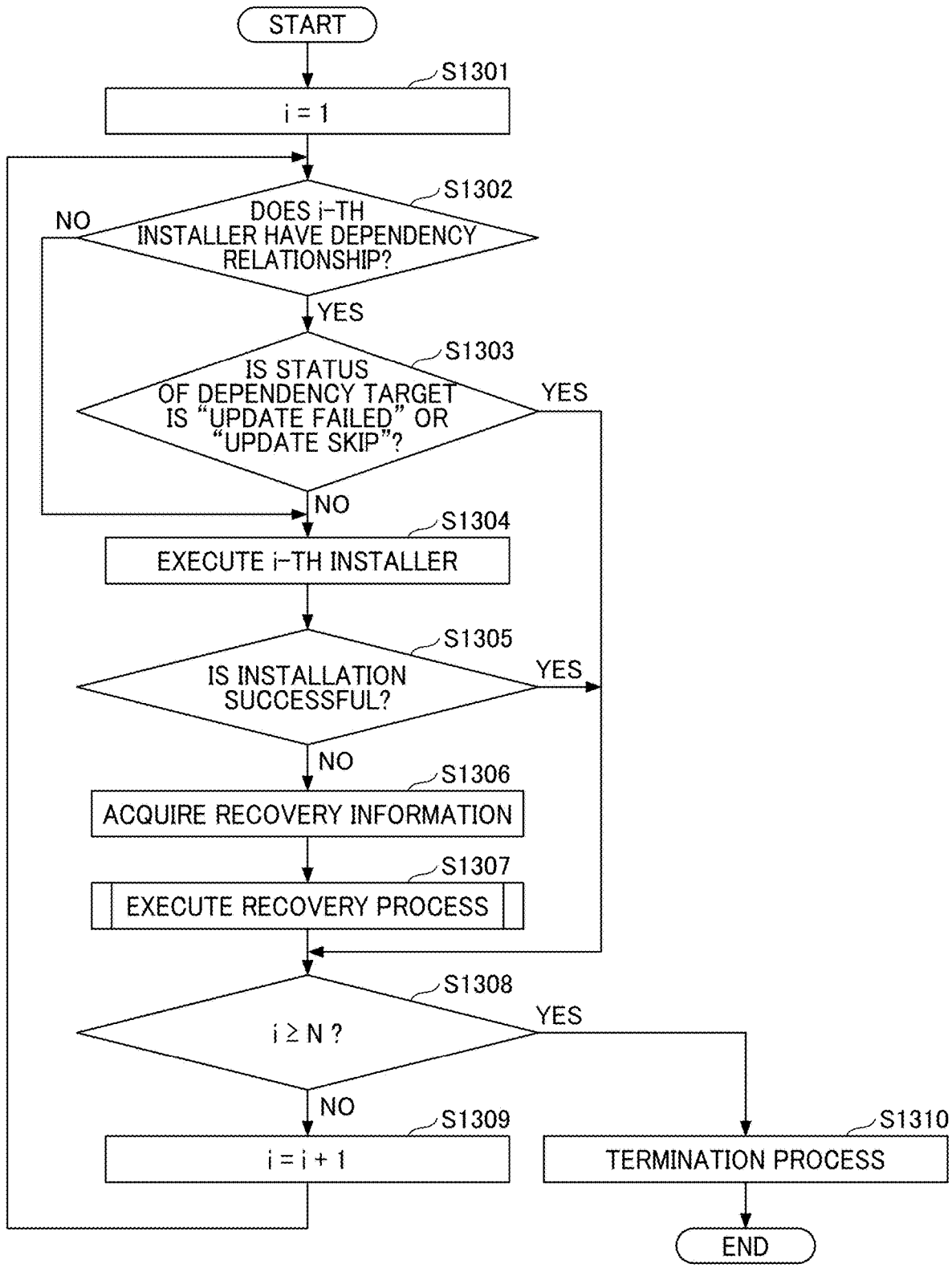
FIG. 13 is a flowchart illustrating an example of update control processing, according to the first embodiment of the present disclosure.

When the update control program 902 is executed, the update control unit 21 performs the update control processing of sequentially executing the installer 903*a*, the installer 903*b*, and the installer 903*c*, in steps S5 to S7. FIG. 13 illustrates an example of the update control processing performed by the update control unit 21.

Update Control Processing:

FIG. 13 is a flowchart illustrating an example of the update control processing, according to the first embodiment. It is assumed that the update management unit 18 of the electronic whiteboard 1 has already acquired the plurality of installers including the installer 903*a*, 903*b*, and 903*c* for updating the plurality of programs to be updated at the start of the processing illustrated in FIG. 13.

In step S1301, the update control unit 21 of the electronic whiteboard 1 initializes a variable i to "1", and performs the update process of the program indicated in steps S1302 to S1307 repeatedly by the N-number of the installers 903 (N is an integer of 1 or more).

In step S1302, the update control unit 21 determines whether the i-th installer among the acquired N-number of the installers 903 has a dependency relationship with another installer among the acquired N-number of the installers 903. For example, when the i-th installer is the installer 903*a* of the OS update patch, the update control unit 21 refers to the OS update patch installer information 911 included in the update information 901 as illustrated in FIG. 9B. In this case, since the OS update patch installer information 911 does not include the item "dependency, the update control unit 21 determines that the i-th installer has no dependency with another installer.

By contrast, when the i-th installer is the installer 903*b* of the application, the update control unit 21 refers to the application installer information 912 included in the update information 901 as illustrated in FIG. 9B. In this case, since the application installer information 912 includes the item "dependency", the update control unit 21 determines that the i-th installer has a dependency relationship with another installer.

When the i-th installer has a dependency relationship, the operation proceeds to step S1303. By contrast, when the i-th installer has no dependency relationship, the operation proceeds to step S1304.

In S1303, the update control unit 21 determines whether the status of the dependency destination is the "update failed" status 1103 or the "update skip" status 1104 described with reference to FIG. 11. When the status of the dependency destination is one of the "update failed" status 1103 and the "update skip" status 1104, the operation proceeds to step S1308. By contrast, when the status of the dependency destination is one of the "before update" status 1101 and the "update succeeded" status 1102, the operation proceeds to step 1304.

In this way, when the update control unit 21 performs the update process of a given program and finds that the update of a different program having a dependency relationship with the given program has been failed or the update of the different program has been skipped, it is preferable to stop the update process of the given program.

In step S1304, the update control unit 21 executes the i-th installer. In step S1305 the update control unit 21 determines whether the installation by the i-th installer has succeeded. As described above, since each installer 903 has a function of returning the reason of failure with an error code when the installation fails, the update control unit 21 determines whether the installation has succeeded based on the error code output from the i-th installer.

When the installation is successful, the operation proceeds to step S1308. By contrast, when the installation is not successful, the operation proceeds to step S1306.

In step S1306, the acquisition unit 22 of the electronic whiteboard 1 acquires the recovery information from the information provision server 612. For example, the acquisition unit 22 acquires the recovery information 1001 corresponding to the i-th installer that has failed to be installed among the plurality of recovery information including the recovery information 1001*a*, the recovery information 1001*b*, and the recovery information 1001*c* managed by the information provision server 612.

In step S1307, the recovery control unit 23 of the electronic whiteboard 1 performs the recovery processing based on the recovery information acquired by the acquisition unit 22. For example, the recovery control unit 23 refers to the association between the error codes and the countermeasures as illustrated in FIG. 10B included in the acquired recovery information, to perform the countermeasure corresponding to the error code. A detailed description is given below of an example of the recovery processing.

In S1308, the update control unit 21 determines whether the value of the variable i is equal to or larger than the N-number, which is the number of the installers 903. In other words, the update control unit 21 determines whether the processes of steps S1302 to S1307 have been performed for all the installers 903. When the value of the variable i is less than the N-number, which the number of installers 903, the operation proceeds to step S1309. By contrast, when the value of the variable i is equal to or larger than the N-number, which the number of installers 903, the operation proceeds to step S1310.

In step S1309, the update control unit 21 adds "1" to the value of the variable i, and performs the processes of step S1302 and subsequent steps again.

In step S1310, the update control unit 21 performs a predetermined ending process. Examples of the ending process include a process of displaying a result display screen indicating the update result, a process of restarting the application 1201 that has terminated in step S4 of FIG. 12, and a process of shutting down the electronic whiteboard 1 or controlling the electronic whiteboard 1 to transit to a power saving state.

Figure 14:
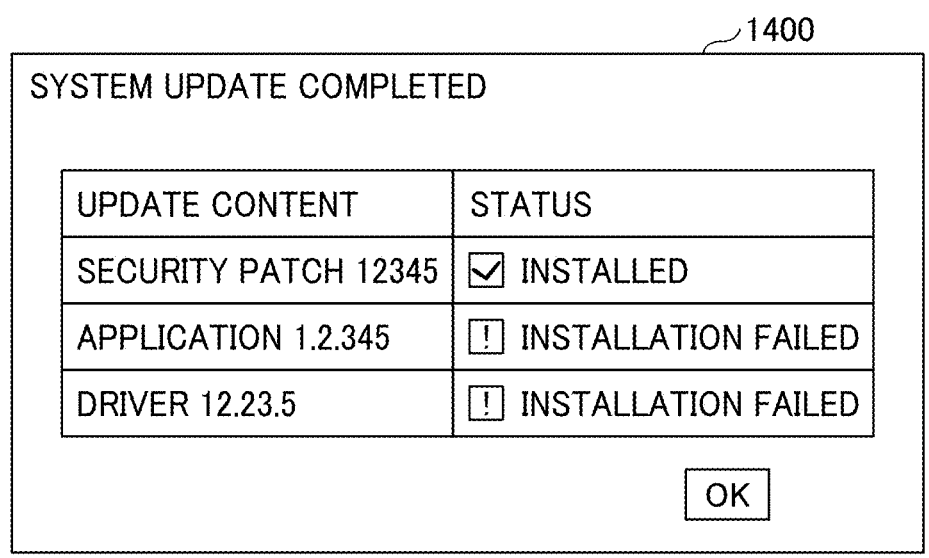
FIG. 14 is a diagram illustrating an example of a result display screen, according to the first embodiment of the present disclosure.

FIG. 14 is an illustration of an example of a result display screen 1400, which the update control unit 21 controls the display control unit. 14 to display. As illustrated in FIG. 14, the result display screen 1400 includes an executed update content and information indicating a status after the update.

Figure 15:
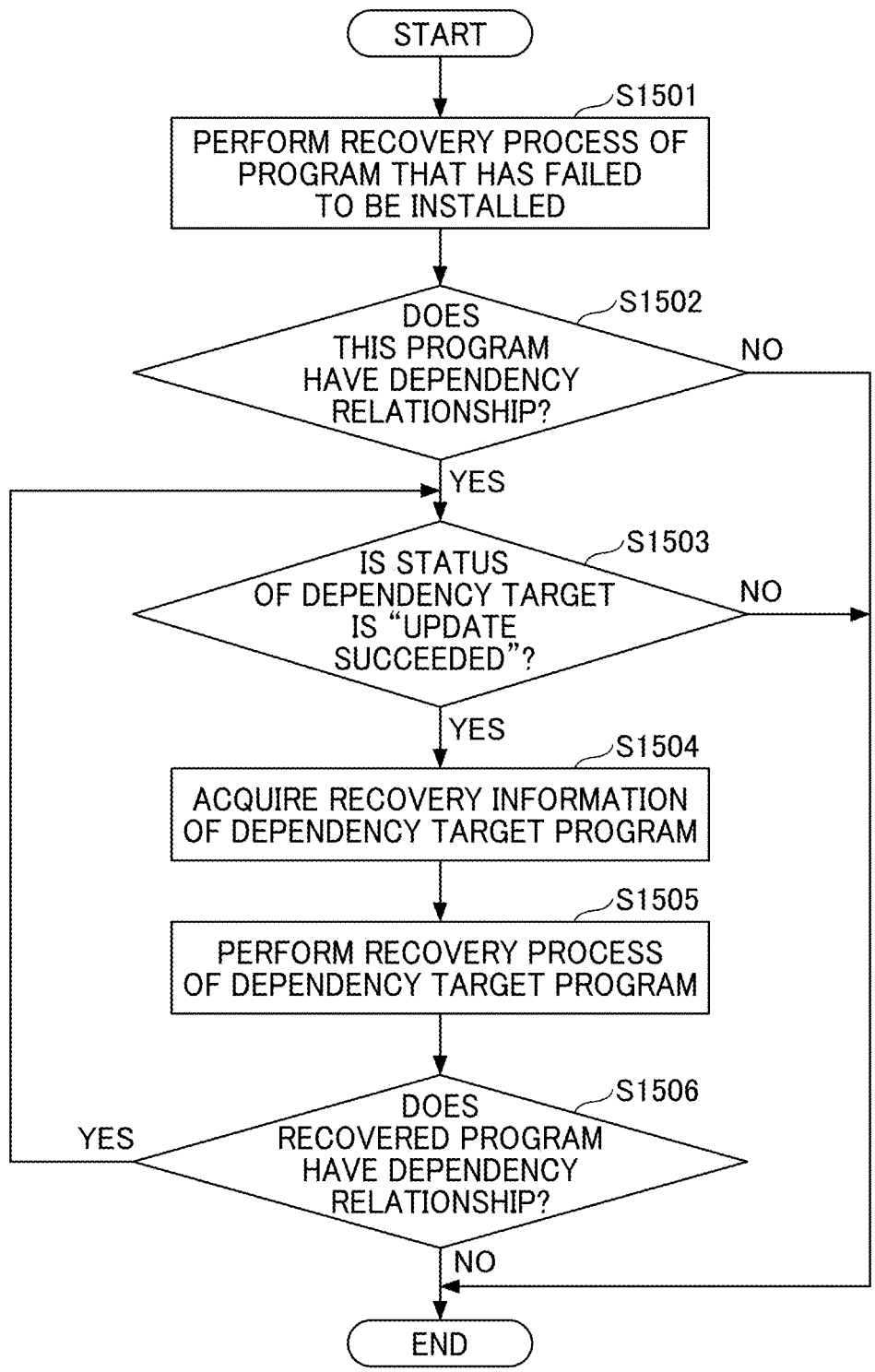
FIG. 15 is a flowchart illustrating an example of a recovery process, according to the first embodiment of the present disclosure.

Recovery Processing 1:

FIG. 15 is a flowchart illustrating an example of the recovery processing, according to the first embodiment. This processing is an example of the recovery processing performed by the recovery control unit 23 in step S1307 of FIG. 13, for example.

In step S1501, the recovery control unit 23 of the electronic whiteboard 1 performs the recovery process of the i-th program that has failed to be installed. For example, the recovery control unit 23 refers to the association between the error codes and the countermeasures as illustrated in FIG. 10B, to perform a particular countermeasure corresponding to the error code output from the installer that has failed to be installed.

For example, when the error code that is output from the installer that has failed to be installed is "1001", the recovery control unit 23 refers to the association illustrated in FIG. 10B, to executes the recovery control program 1002b of the driver. In substantially the same manner, when the error code that is output from the installer that has failed to be installed is "1003", the recovery control unit 23 refers to the association illustrated in FIG. 10B, to execute the batch file 1004, and thereafter executes the recovery control program 1002b of the driver.

In step S1502, the recovery control unit 23 determines whether the program on which the recovery processing is performed in step S1501 has a dependency relationship. Specifically, the recovery control unit determines whether there is the dependency relationship in substantially the same manner as step S1302 of FIG. 13. When the program has no dependency relationship, the recovery control unit 23 ends the recovery processing illustrated in FIG. 15. By contrast, when the program has the dependency relationship, the operation proceeds to step S1503.

In step S1503, the recovery control unit 23 determines whether the status of the dependency destination is the "update succeeded" status 1102. When the status of the dependency destination is the "update succeeded" status 1102, the operation proceeds to step S1504. By contrast, when the status of the dependency destination is the status other than the "update succeeded" status 1102, the recovery control unit 23 ends the recovery processing illustrated in FIG. 15.

In S1504, the recovery control unit 23 acquires the recovery information 1001 of the dependency destination from the information provision server 612. For example, as illustrated in FIG. 7, it is assumed that there is the dependency between the installer 903b of the application and the installer 903c of the driver. It is also assumed that the driver installation fails after the application installation succeeds. In this case, the recovery control unit 23 acquires the recovery information 1001b of the application that has a dependency relationship with the driver that has failed to be installed.

In step S1505, the recovery control unit 23 performs the recovery processing of the program as the dependency destination, based on the acquired recovery information. For example, when the program as the dependency destination is an application, the recovery control unit 23 executes the recovery control program 1002b of the application.

In step S1506, the recovery control unit 23 determines whether the program recovered in step S1505 has a dependency relationship. When the recovered program has no dependency relationship, the recovery control unit 23 ends the operation of FIG. 15. By contrast, when the recovered program has a dependency relationship, the recovery control unit 23 performs the processes of step S1503 and subsequent steps.

Through the above processing, when the update of one or more of the plurality of programs to be updated has failed, the recovery control unit 23 restores the one or more programs whose installation has failed and another (other) program(s) that has a dependency relationship with the one or more programs whose installation has failed to the status before the update.

Thus, according to the present embodiment, in the electronic whiteboard 1 (an example of an information processing apparatus) that updates a plurality of programs, when an update of one or more programs of the plurality of programs fails, the electronic whiteboard 1 is restored so that the electronic whiteboard operates normally.

Figure 16:
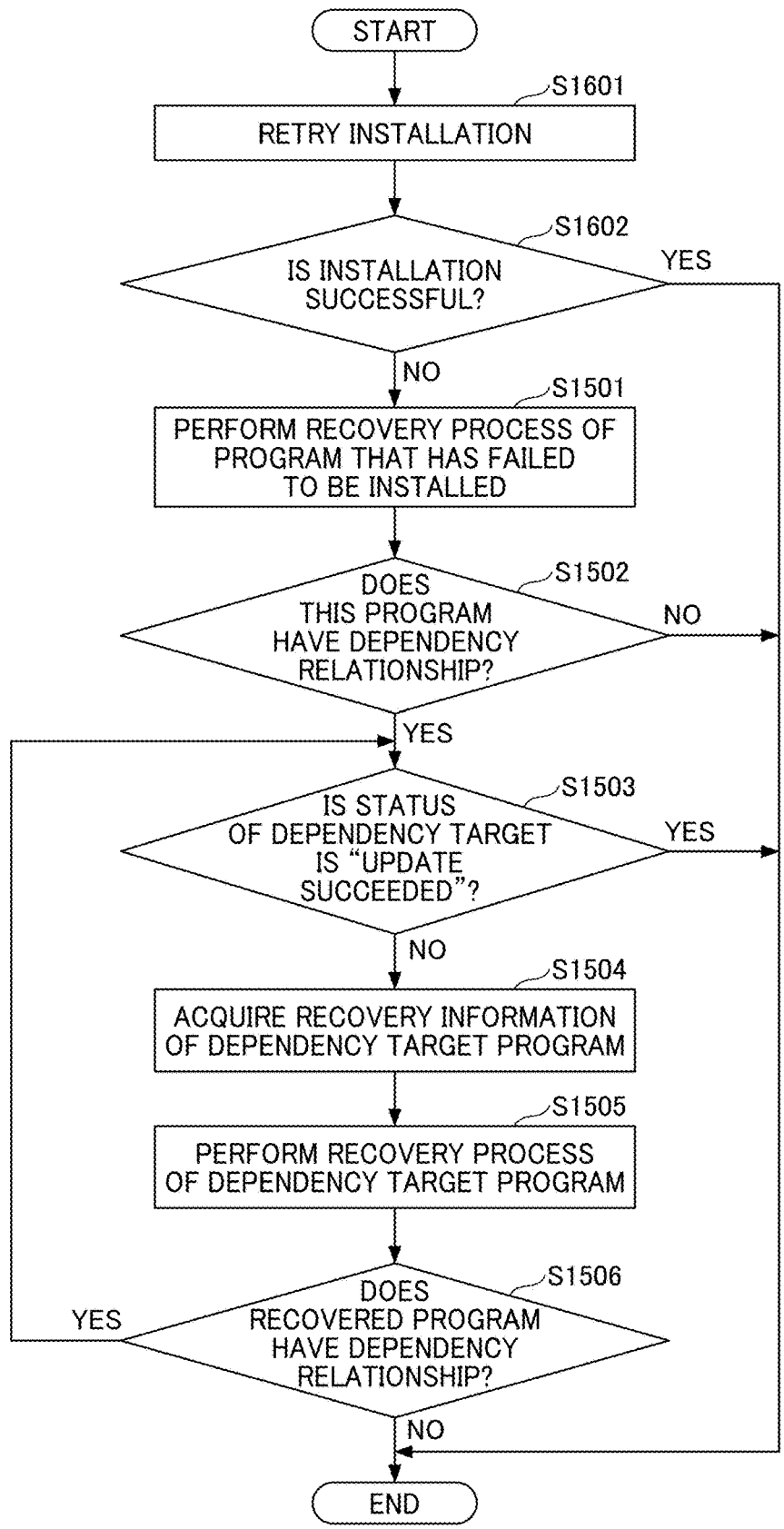
FIG. 16 is a flowchart illustrating another example of the recovery process, according to the first embodiment of the present disclosure.

Recovery Processing 2:

FIG. 16 is a flowchart illustrating another example of the recovery processing, according to the first embodiment. This processing is another example of the recovery processing performed by the recovery control unit 23 in step S1307 of FIG. 13, for example.

In this example, a description is given of an operation of retrying an update process by the installer 903 whose installation has failed, before performing the recovery processing illustrated in FIG. 15. Processes of steps S1501 to S1506 of FIG. 16 are performed in substantially the similar manner as described above referring to steps S1501 to S1506 of FIG. 15, and redundant descriptions thereof are omitted.

In step S1601, the recovery control unit 23 of the electronic whiteboard 1 retries (re-executes) the installation of the i-th program that has failed to be installed. For example, the recovery control unit 23 refers to the association between the error codes and the countermeasures as illustrated in FIG. 10B, to retry the installation according to a particular countermeasure corresponding to the error code output from the installer that has faded to be installed.

For example, when the error code output from the installer that has failed to be installed is "1002", the recovery control unit 23 acquires the DLL file 1003 from the information provision server 612, and thereafter reboot the electronic whiteboard 1. Further, the recovery control unit 23 re-executes the installer 903c of the driver after rebooting. The process of step S1601 is one example of a first recovery process of retrying an update process of a program whose update has failed according to the recovery information.

In step S1602, the recovery control unit 23 determines whether the installation is successful by the process of step S1601. If the installation has failed, the recovery control unit 23 executes the recovery processing (second recovery processing) of step S1501 and subsequent steps. On the other hand, when the installation is successful, the recovery control unit 23 cancels the execution of the recovery processing (second recovery processing) of step S1501 and subsequent steps, and ends the operation of FIG. 16.

Through the above processing, the possibility increases that each program is updated successfully by the update control program 902.

Second Embodiment

In the first embodiment, the electronic whiteboard 1 acquires the electronic files required for updating the programs, the electronic files required for restoring the programs, etc. from the update management server 611 and the information provision server 612. However, the present disclosure is not limited to this example. In another example, the information processing system 600 may acquire, from a storage medium 31 such as the USB memory 131, the entirety or a part of the electronic files required for updating the programs and the electronic files required for restoring the programs.

Figure 17:
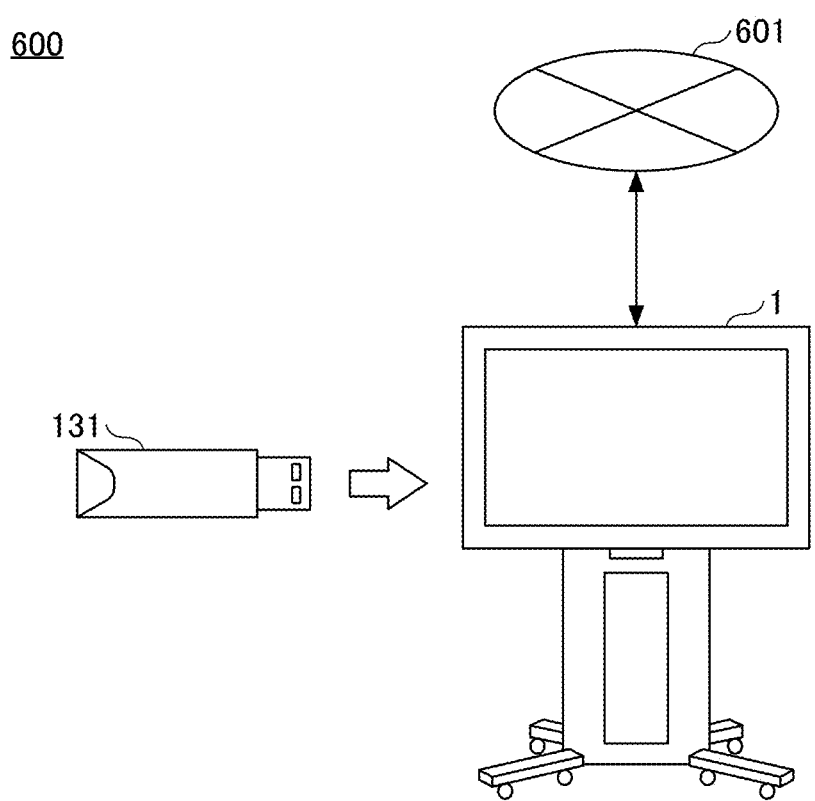
FIG. 17 is a diagram illustrating an example of a system configuration of an information processing system, according to a second embodiment of the present disclosure.

System Configuration:

FIG. 17 is a diagram illustrating an example of a system configuration of an information processing system 600, according to a second embodiment. The information processing system 600 according to the second embodiment includes the electronic whiteboard 1, and the storage medium 31 such as the USB memory 131 in which the entirety or a part of the electronic file required to update the programs and the electronic files required to recover the programs are stored in advance. The electronic whiteboard 1 is an example of an information processing apparatus. In another example, any suitable apparatus or device can be the information processing apparatus such as the videoconference terminal 10, the communication management system 5, the relay device 3, and the image storage device 7.

In addition, the electronic whiteboard 1 may acquire a part of the electronic files required for updating the programs and the electronic files necessary for recovering the programs from the update management server 611, the information provision server 612, or the like through the communication network 601.

Figure 18A:
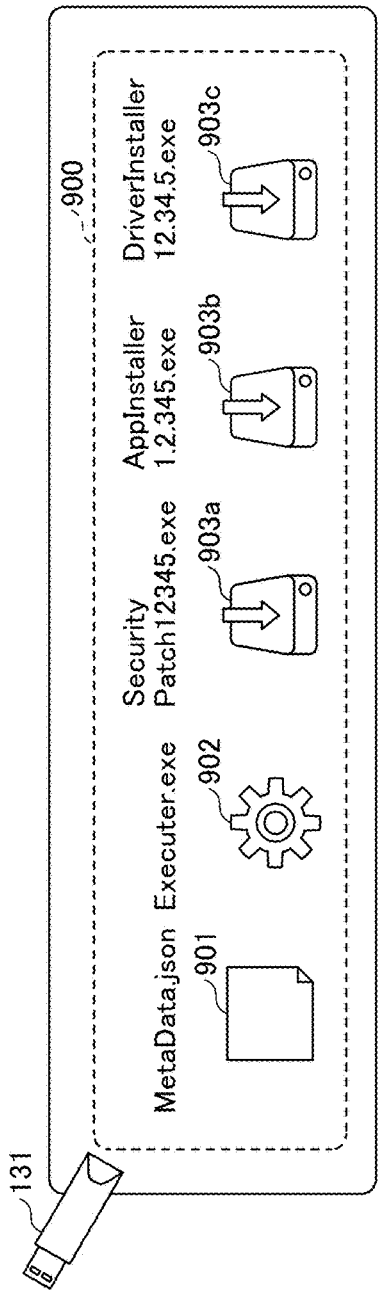
FIGS. 18A and 18B are illustrations of an example of electronic files stored in a storage medium, according to the second embodiment of the present disclosure.
Figure 18B:
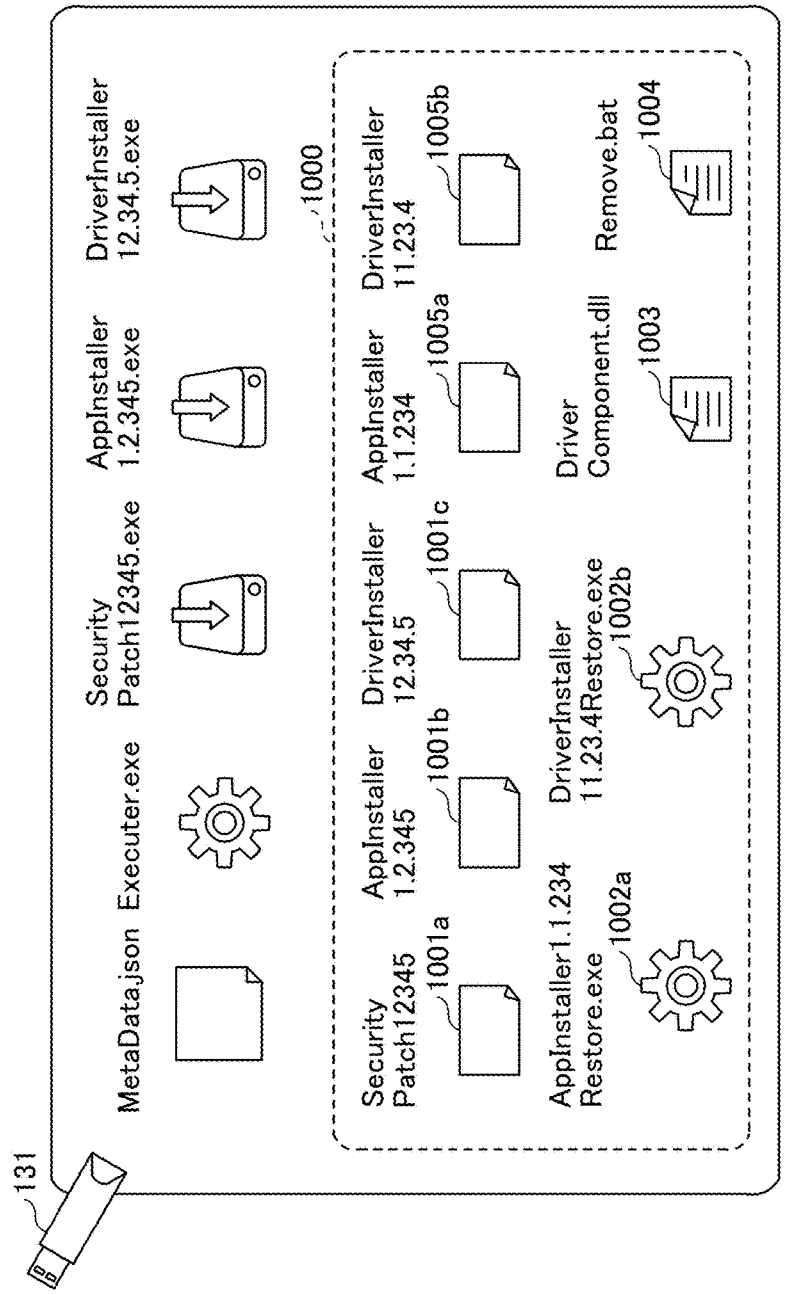

Electronic Files Stored in Storage Medium:

FIG. 18 is an illustration of an example of the electronic files stored in the storage medium 31, according to the second embodiment.

In the example of FIG. 18A, the update file 900 managed by the update management server 611 according to the first embodiment is stored in advance in the USB memory 131, which is an example of the storage medium 31.

This enables the electronic whiteboard 1 to acquire the information acquired from the update management server 611 in steps S1 and S2 of FIG. 12, for example, from the USB memory 131.

In another example, the USB memory 131, which is an example of the storage medium 31, may store in advance the recovery file 1000 managed by the information provision server 612 according to the first embodiment, in addition to (or instead of) the update file 900.

This enables the electronic whiteboard 1 to acquire, from the USB memory 131, a part or the entirety of the update file 900, which is acquired from the information provision server 612 in steps S1306 and S1307 of FIG. 13, for example.

Each operation described above with reference to FIGS. 12, 13, 15, and 16 is applied to the second embodiment, except for that a source from which of the update file 900, the recovery file 1000, and the like are acquired is changed to the storage medium 31 such as the USB memory 131.

Also in the present embodiment, when the update of one or more of the programs to be updated has failed, the recovery control unit 23 restores the one or more programs whose installation has failed and another (other) program(s) that has a dependency relationship with the one or more programs whose installation has failed to the status before the update.

As described heretofore, according to each embodiment of the present disclosure, in the electronic whiteboard 1 (an example of an information processing apparatus) that updates a plurality of programs, when an update of one or more programs of the plurality of programs fails, the electronic whiteboard 1 is restored so that the electronic whiteboard operates normally.

In conventional system according to the related art, when an update of one or more programs fails, a message indicating that the update has failed is displayed to a user. However, the system is not restored to a normal operation state.

According to one or more embodiments of the present disclosure, in an information processing apparatus that updates a plurality of programs, when an update of one or more programs of the plurality of programs fails, the information processing apparatus is restored so that the information processing apparatus operates normally.

Each of the functions of the described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

What is claimed is:

1. An information processing apparatus that executes a plurality of programs, the information processing apparatus comprising circuitry configured to:
   control execution of a plurality of update processes of updating the plurality of programs;
   when an update of a particular program performed by one or more update processes of the plurality of update processes has failed, acquire recovery information for recovering a function of the particular program whose update has failed;
   execute a recovery process of recovering the function implemented by the particular program whose update has failed, based on the recovery information; and
   execute one of the plurality of update processes for another program based on update information including information on a plurality of installers that update the plurality of programs and information indicating a dependency relationship between the plurality of installers.

2. The information processing apparatus of claim 1, wherein
   the recovery information includes information for returning each of the particular program whose update has failed and the another program that has the dependency relationship with the particular program whose update has failed to a status before the update.

3. The information processing apparatus of claim 1, wherein
   the recovery process includes a process of returning each of the particular program whose update has failed and the another program that has the dependency relationship with the particular program whose update has failed to a status before the update.

4. The information processing apparatus claim 1, wherein the recovery process includes
a first recovery process of retrying an update process of the particular program whose update has failed according to the recovery information, and
a second recovery process to be performed when the update by the first recovery process of the particular program whose update has failed fails, the second recovery process being a process of returning each of the particular program whose update has failed and the another program that has the dependency relationship with the particular program whose update has failed to a status before the update.

5. The information processing apparatus of claim 1, wherein
when the circuitry performs an update process of one program among the plurality of programs, in a case in which an update of the another program that has the dependency relationship with the one program has failed, the circuitry cancels an update process of the one program.

6. An update control method, performed by an information processing apparatus that executes a plurality of programs, the method comprising:
controlling execution of a plurality of update processes of updating the plurality of programs;
when an update of a particular program performed by one or more update processes of the plurality of update processes has failed, acquiring recovery information for recovering a function of the particular program whose update has failed;
executing a recovery process of recovering the function implemented by the particular program whose update has failed, based on the recovery information; and
executing one of the plurality of update processes for another program based on update information including information on a plurality of installers that update the plurality of programs and information indicating a dependency relationship between the plurality of installers.

7. An information processing system comprising an update control program that causes an information processing apparatus that executes a plurality of programs to:
control execution of a plurality of update processes of updating the plurality of programs;
when an update of a particular program performed by one or more update processes of the plurality of update processes has failed, acquire recovery information for recovering a function of the particular program whose update has failed;
execute a recovery process of recovering the function implemented by the particular program whose update has failed, based on the recovery information; and
execute one of the plurality of update processes for another program based on update information including information on a plurality of installers that update the plurality of programs and information indicating a dependency relationship between the plurality of installers.

8. The information processing system of claim 7, further comprising update management system communicable with the information processing apparatus through a communication network, the update management system providing the information processing apparatus with the recovery information.

9. The information processing system of claim 7, further comprising a storage medium storing the recovery information in advance.

10. The information processing apparatus of claim 1, wherein the circuitry is further configured to:
determine the dependency relationship between the particular program whose update has failed and another program among the plurality of programs; and
control execution of the one of the plurality of update processes for the another program in accordance with the determined dependency relationship.

* * * * *